(12) United States Patent
Itakura

(10) Patent No.: US 11,657,514 B2
(45) Date of Patent: May 23, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kina Itakura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 326 days.

(21) Appl. No.: 16/887,652

(22) Filed: May 29, 2020

(65) Prior Publication Data

US 2020/0293809 A1 Sep. 17, 2020

Related U.S. Application Data

(63) Continuation of application No. 15/707,105, filed on Sep. 18, 2017, now Pat. No. 10,824,895.

(30) Foreign Application Priority Data

Sep. 26, 2016 (JP) ................................. 2016-187494
Sep. 28, 2016 (JP) ................................. 2016-190052

(51) Int. Cl.
*G06V 10/25* (2022.01)
*G06V 20/00* (2022.01)
(Continued)

(52) U.S. Cl.
CPC ................ *G06V 10/25* (2022.01); *G06T 7/11* (2017.01); *G06T 7/174* (2017.01); *G06T 7/194* (2017.01);
(Continued)

(58) Field of Classification Search
CPC .......... G06V 10/25; G06V 20/00; G06T 7/11; G06T 7/174; G06T 7/194; G06T 2207/10024; G06T 2207/30228
See application file for complete search history.

(56) References Cited

U.S. PATENT DOCUMENTS

2010/0153449 A1 6/2010 Baba et al.
2014/0003711 A1* 1/2014 Ngan ....................... G06T 7/136
                                                          382/164
2017/0094196 A1* 3/2017 Adsumilli ................. G06T 7/11

FOREIGN PATENT DOCUMENTS

JP   H11328365 A   11/1999
JP   2011048627 A   3/2011
(Continued)

OTHER PUBLICATIONS

Extended European Search Report dated Nov. 9, 2017 in corresponding European Patent Application No. 17001482.3, 6 pages.
(Continued)

*Primary Examiner* — Ping Y Hsieh
*Assistant Examiner* — Daniella M. DiGuglielmo
(74) *Attorney, Agent, or Firm* — Carter, DeLuca & Farrell LLP

(57) ABSTRACT

An object of the present invention is to extract an area of a foreground object with high accuracy. The present invention is an image processing apparatus including: a target image acquisition unit configured to acquire a target image that is a target of extraction of a foreground area; a reference image acquisition unit configured to acquire a plurality of reference images including an image whose viewpoint is different from that of the target image; a conversion unit configured to convert a plurality of reference images acquired by the reference image acquisition unit based on a viewpoint corresponding to the target image; and an extraction unit configured to extract a foreground area of the target image (Continued)

by using data relating to a degree of coincidence of a plurality of reference images converted by the conversion unit.

17 Claims, 21 Drawing Sheets

(51) Int. Cl.
 *G06T 7/194* (2017.01)
 *G06T 7/11* (2017.01)
 *G06T 7/174* (2017.01)

(52) U.S. Cl.
 CPC .... *G06V 20/00* (2022.01); *G06T 2207/10024* (2013.01); *G06T 2207/30228* (2013.01)

(56) References Cited

FOREIGN PATENT DOCUMENTS

| JP | 2012104053 A |   | 5/2012  |
|----|--------------|---|---------|
| JP | 2013143702 A | * | 7/2013  |
| JP | 2013143702 A |   | 7/2013  |
| JP | 2014230180 A |   | 12/2014 |

OTHER PUBLICATIONS

Ming Xu et al., "A Multiview Approach to Robust Detection in the Presence of Cast Shadows," 2011 Sixth International Conference on Image and Graphics (ICIG), IEEE Computer Society, Aug. 12, 2011, pp. 494-499.

Notice of Reasons for Refusal issued by the Japan Patent Office dated May 24, 2022 in corresponding JP Patent Application No. 2021-068487, with English translation.

* cited by examiner

FIG.19

| FIG.19A |
|---------|
| FIG.19B |

FIG.19A

START
↓
S1501 ACQUIRE TARGET IMAGE AND DETERMINE VIEWPOINT FROM WHICH TARGET IMAGE HAS BEEN CAPTURED TO BE VIEWPOINT OF INTEREST
↓
S1502 ACQUIRE BACKGROUND IMAGE AT VIEWPOINT OF INTEREST
↓
S1503 ACQUIRE FOREGROUND IMAGES AT A PLURALITY OF DIFFERENT VIEWPOINTS
↓
S1504 CONVERT A PLURALITY OF FOREGROUND IMAGES INTO IMAGES, RESPECTIVELY, IN CASE WHERE IT IS VIEWED FROM VIEWPOINT OF INTEREST WITH GROUND SURFACE AS BASE
↓
S1505 INITIALIZE FLAG MAP
↓
S1506 DETERMINE PIXEL OF INTEREST
↓
S1507 CALCULATE EVALUATION VALUE
↓
S1508 UPDATE PIXEL VALUE OF FLAG MAP BASED ON EVALUATION VALUE
↓
S1509 HAVE ALL PIXELS BEEN PROCESSED?
  NO → S1506
  YES ↓
S1510 DETERMINE PIXEL OF INTEREST

IMAGE PROCESSING APPARATUS, IMAGE PROCESSING METHOD, AND STORAGE MEDIUM

CROSS REFERENCE TO RELATED APPLICATIONS

This application is a continuation of U.S. patent application Ser. No. 15/707,105, filed on Sep. 18, 2017, which claims the benefit of and priority to Japanese Patent Application No. 2016-187494, filed on Sep. 26, 2016 and Japanese Patent Application No. 2016-190052, filed on Sep. 28, 2016, each of which is hereby incorporated by reference herein in their entirety.

BACKGROUND OF THE INVENTION

Field of the Invention

The present invention relates to a technique to extract a foreground area from a captured image.

Description of the Related Art

Conventionally, as a method of extracting a foreground area from a captured image, there exists a background differential method. In the background differential method, a foreground area is extracted based on the difference for each pixel between the pixel value of a captured image in which a foreground object and a background are photographed and the pixel value of a background image in which only the background is photographed. At this time, in the case where an image captured in advance under specific conditions is used as a background image, on a condition that the background changes due to a change in sunlight accompanying an elapse of time, there is such a problem that the extraction accuracy of a foreground area is reduced.

Regarding the above-described problem, Japanese Patent Laid-Open No. 2012-104053 describes extraction of a foreground area by using a background image created based on a plurality of images whose image capturing times are different.

Further, Japanese Patent Laid-Open No. 2014-230180 describes extraction of a foreground area by using a background image created based on a plurality of images captured from different viewpoints at the same point in time.

SUMMARY OF THE INVENTION

However, with the conventional technique, there is a possibility that the extraction accuracy of a foreground area is reduced. For example, in Japanese Patent Laid-Open No. 2012-104053, in the case where the foreground area does not move and remains stationary, it is determined erroneously that this foreground area is a background, and therefore, it is not possible to create the background image with high accuracy. Because of this, there is such a problem that the extraction accuracy of a foreground area is reduced.

Further, in Japanese Patent Laid-Open No. 2014-230180, a background image is created by making up the information on the background that is not seen from a single viewpoint by information obtained from another viewpoint, but in an area or the like where a plurality of foreground areas existing within a scene overlaps, it is not possible to create a background image with high accuracy. Because of this, there is such a problem that the extraction accuracy of a foreground area is reduced.

Consequently, an object of the present invention is to extract a foreground area with high accuracy in view of the above-described problem.

The present invention is an image processing apparatus including: a target image acquisition unit configured to acquire a target image that is a target of extraction of a foreground area; a reference image acquisition unit configured to acquire a plurality of reference images including an image whose viewpoint is different from that of the target image; a conversion unit configured to convert a plurality of reference images acquired by the reference image acquisition unit based on a viewpoint corresponding to the target image; and an extraction unit configured to extract a foreground area of the target image by using data relating to a degree of coincidence of a plurality of reference images converted by the conversion unit.

Further features of the present invention will become apparent from the following description of exemplary embodiments with reference to the attached drawings.

BRIEF DESCRIPTION OF THE DRAWINGS

FIG. 19 is a diagram showing the relationship of FIGS. 19A and 19B;

FIG. 19A is a flowchart showing a flow of processing to extract a foreground area in the fifth embodiment;

DESCRIPTION OF THE EMBODIMENTS

In the following, embodiments of the present invention are explained with reference to the drawings. However, the following embodiments are not intended to limit the present invention and all the combinations of the features explained in the following embodiments are not necessarily indispensable for the solution of the present invention. Explanation is given by attaching the same symbol to the same component.

First Embodiment

In a first embodiment, based on an image including a foreground and a background at a plurality of different viewpoints (hereinafter, reference image), a background image not including a foreground at a viewpoint of interest (hereinafter, foreground-removed image) is created. Then, by using the foreground-removed image, a foreground area is extracted from a processing-target image. In the present invention, in view of circumstances, the term "foreground-removed image" is used in explanation, but it should be noted that there is a possibility that a foreground area is photographed in part of the foreground-removed image. Further, the viewpoint of interest may be a viewpoint of a camera selected from among a plurality of cameras or may be a virtual viewpoint. The virtual viewpoint is a viewpoint that is freely (or under fixed restrictions) set virtually by a user irrespective of the position of the camera.

<About Outline of Processing to Extract Foreground Area>

Figure 4:
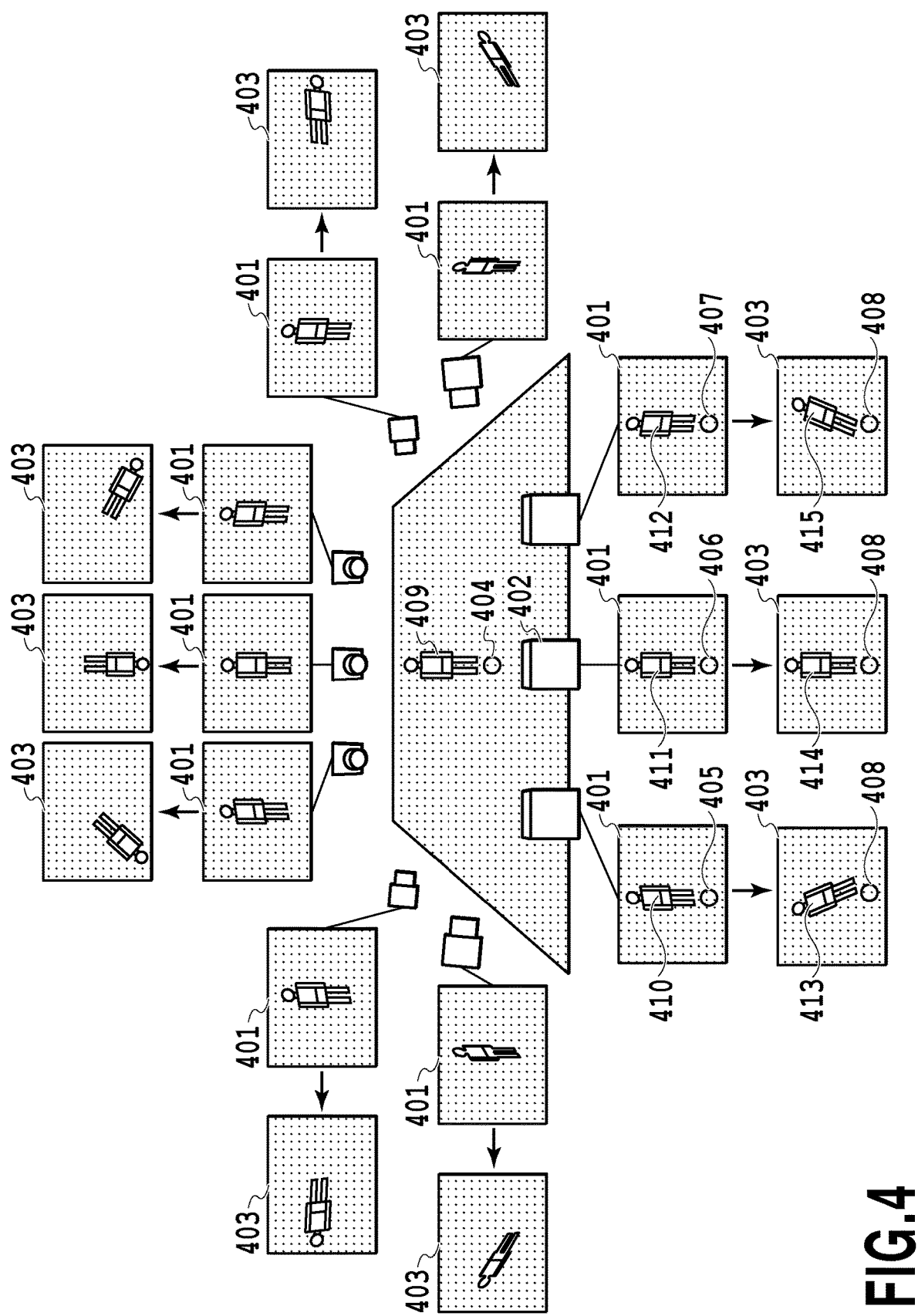
FIG. 4 is a diagram explaining an outline of the processing to extract a foreground area in the first embodiment.

In the following, an outline of processing to extract a foreground area in the present embodiment is explained by using FIG. 4. In the present embodiment, first, reference images 401 at a plurality of different viewpoints are acquired. The reference image that is acquired here does not need to be an image that does not in the least include a foreground image, but is desirably an image captured at a time close to the time at which the target image from which a foreground area is to be extracted is captured. It is assumed that an image at the same viewpoint as a viewpoint 402 from which an image that is a target of extraction of a foreground area is captured is included in a plurality of reference images 401 to be acquired. Hereinafter, an image from which a foreground area is to be extracted is called a target image (data), images based on photographing from a plurality of viewpoints are called reference images (data), and a viewpoint from which a target image (data) is captured is called a viewpoint of interest.

Next, by converting the acquired reference image 401 into an image in the case where the reference image 401 is viewed from the viewpoint of interest 402 with a ground surface as a base for each viewpoint, a reference image 403 at the viewpoint of interest is created. The number of reference images 403 to be created here is the same as the number of reference images 401. However, the numbers do not necessarily need to be the same at all times. Hereinafter, the reference image 403 that is obtained by converting the reference image 401 is called the converted reference image 403. In the present embodiment, the example is explained mainly in which conversion of an image is performed with the ground surface as a base, but this is not limited. For example, it may also be possible to take the water surface as a base and in the case where the altitude of the ground surface is different depending on the position, it may also be possible to convert an image by taking the averaged altitude as a base for each area. That is, in the present embodiment, by converting the reference image 401 based on a predetermined base surface, the converted reference image 403 is created.

Here, the foreground (object) means an object that satisfies predetermined conditions among the objects included in the captured image. Unless described in particular, in the following, the foreground object and the foreground are used as having the same meaning. For example, in the case where the image capturing-target is a competitive game scene, such as a sport, persons, such as a player and a referee, facilities, such as a goal, and gear, such as a ball, may be a foreground object. Typically, the foreground object includes what keeps moving in a plurality of images captured continuously along a time series. On the other hand, the background corresponds to the area other than the foreground object in the captured image. For example, in the case where the image capturing-target is a competitive game scene, such as a sport, the ground made up of lawn and soil, the floor of a gymnasium, and so on may be a background. Many backgrounds are stationary at almost all times in a plurality of images captured continuously along a time series. However, there is a case where the area in which there is movement, such as a spectator stand, is recognized as a background.

In the present embodiment, a case is supposed where the foreground object has an altitude from the ground surface, but on the other hand, the background does not have an altitude from the ground surface. Consequently, by detecting a foreground object having an altitude from the ground surface by using a plurality of converted reference images 403 and removing the detected foreground object from a target image, a foreground-removed image at the viewpoint of interest 402 is created. Specifically, for the plurality of converted reference images 403 including the image at the viewpoint of interest 402, a degree of coincidence between pixels of interest is calculated for each pixel and a pixel whose degree of coincidence is low is detected as a pixel of the image area of the foreground object. It is possible to say the degree of coincidence by another term, such as a degree of similarity and a degree of difference. As described above, the converted reference image 403 is an image obtained by converting the reference image 401 into an image in the case where the reference image 401 is viewed from the viewpoint of interest 402 with the ground surface as a base. Consequently, the coordinates of areas 405 to 407 in the reference image 401, which correspond to an area 404 of the floor surface that exists on the ground surface and has no altitude, are converted respectively into the coordinates of an area 408 that exists at the same position in common in all the converted reference images 403. On the other hand, the coordinates of areas 410 to 412 in the reference image 401, which correspond to a player 409 having an altitude, are converted respectively into the coordinates of areas 413 to 415 whose positions are different for different viewpoints. Consequently, in the plurality of converted reference images 403, the pixel whose degree of coincidence between pixels of interest is high is regarded as a pixel of the image area of the background having no altitude and a pixel whose degree of coincidence is low is regarded as a pixel of the image area of the foreground object having an altitude. In this manner, a foreground-removed image is created. Then, by comparing the created foreground-removed image at the viewpoint of interest 402 with the target image, a foreground area is extracted from the target image.

The above is the outline of the processing that is performed in the present embodiment. The target image is not limited to the above-described example and it is possible to use a variety of images, such as data of an image captured by a monitoring camera. Further, here, the case is explained where the image at the viewpoint of interest is included in the reference images 401, but it is also possible to apply the present embodiment to the case where an image at the viewpoint of interest is not included in the reference images, and a specific processing method will be described later.

<About Hardware Configuration of Image Processing Apparatus>

Figure 1:
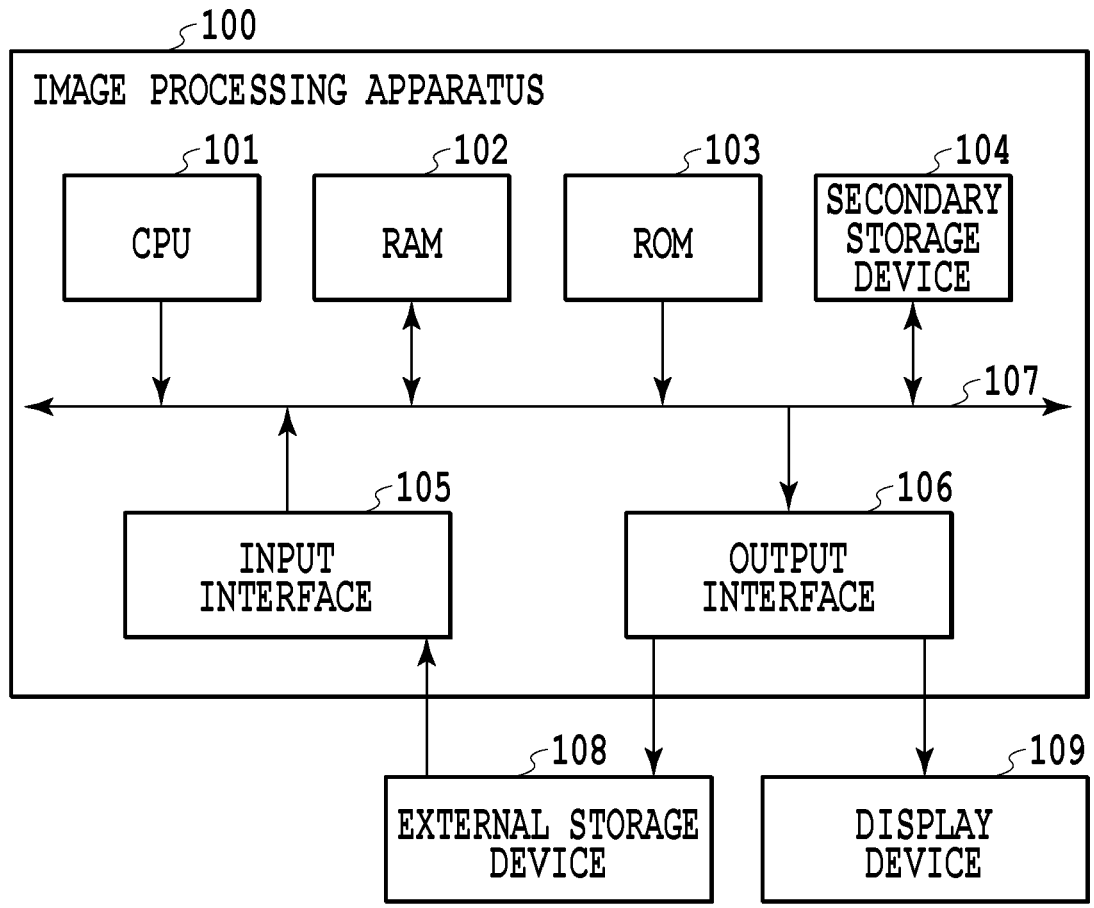
FIG. 1 is a block diagram showing a hardware configuration of an image processing apparatus in first to third embodiments.

In the following, a hardware configuration of an image processing apparatus of the present embodiment is described. FIG. 1 is a block diagram showing an example of a hardware configuration of an image processing apparatus of the present embodiment. An image processing apparatus 100 of the present embodiment includes a CPU 101, a RAM 102, a ROM 103, a secondary storage device 104, an input interface 105, and an output interface 106 and these components are connected to one another via a system bus 107. Further, the image processing apparatus 100 is connected to an external storage device 108 via the input interface 105 and connected with the external storage device 108 and a display device 109 via the output interface 106.

The CPU 101 executes programs stored in the ROM 103 by using the RAM 102 as a work memory and centralizedly controls each component of the image processing apparatus 100 via the system bus 107. Due to this, various kinds of processing, to be described later, are performed.

The secondary storage device 104 is a storage device that stores various kinds of data handled in the image processing apparatus 100 and an HDD is used in the present embodiment. It is possible for the CPU 101 to write data to the secondary storage device 104 and to read data stored in the secondary storage device 104 via the system bus 107. As the secondary storage device 104, it is possible to use a variety of storage devices, such as an optical disk drive and a flash memory, in addition to an HDD.

The input interface 105 is a serial bus interface, for example, such as USB and IEEE 1394, and input of data, a command, and so on to the image processing apparatus 100 from an external device are performed via the input interface 105. The image processing apparatus 100 acquires data from the external storage device 108 (e.g., storage medium such as hard disk, memory card, CF card, SD card, and USB memory) via the input interface 105. It is also possible to connect an input device (not shown schematically) for a user to input, such as a mouse and a keyboard, to the input interface 105. The output interface 106 includes a video output terminal, for example, such as DVI and HDMI (registered trademark), in addition to the serial bus interface, such as USB and IEEE 1394, similar to the input interface 105. Data is output from the image processing apparatus 100 to an external device via the output interface 106. The image processing apparatus 100 produces a display of an image by outputting a processed image and the like to the display device 109 (various kinds of image display device, such as liquid crystal display) via the output interface 106. There exist components of the image processing apparatus 100 other than those described above, but they are not the main purpose of the present invention, and therefore, explanation thereof is omitted.

<About Processing to Extract Foreground Area>

Figure 2:
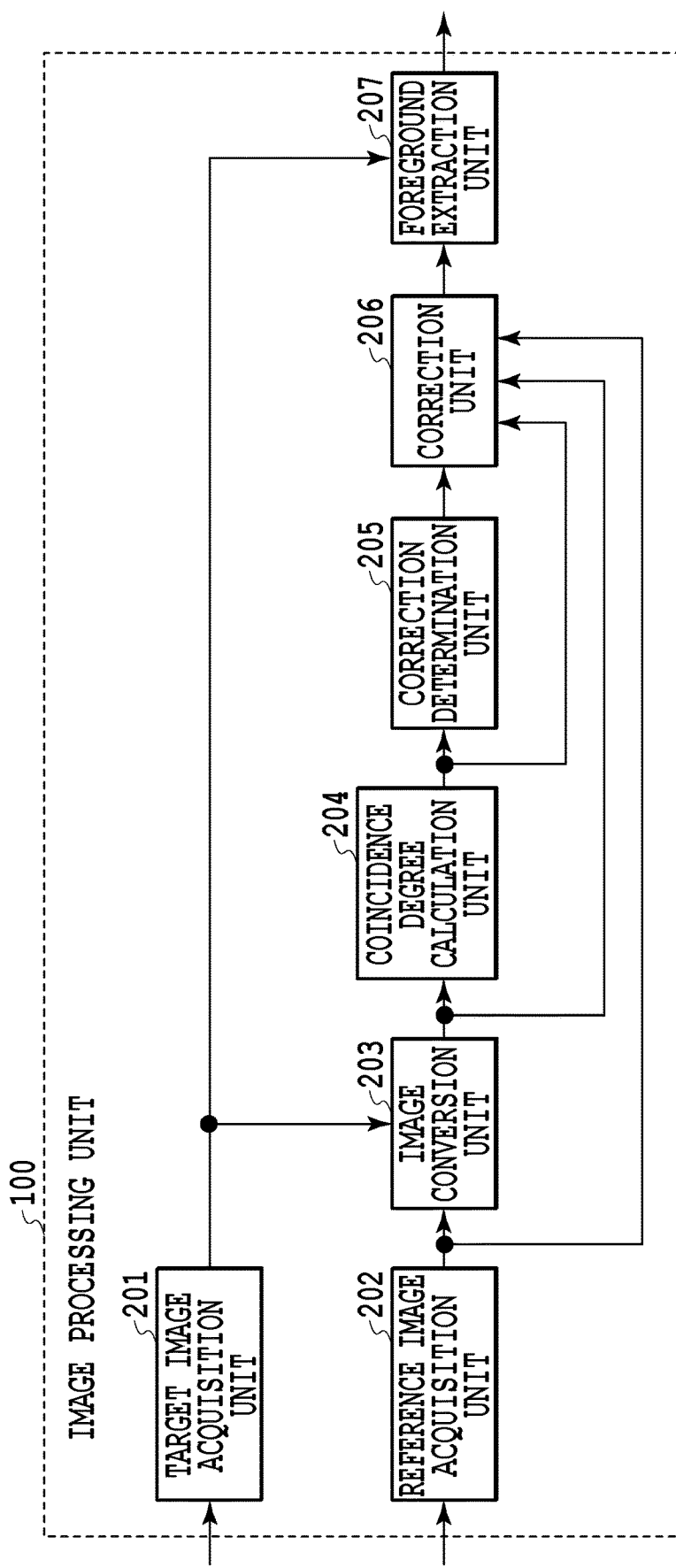
FIG. 2 is a block diagram showing a function configuration of the image processing apparatus in the first embodiment.
Figure 3:
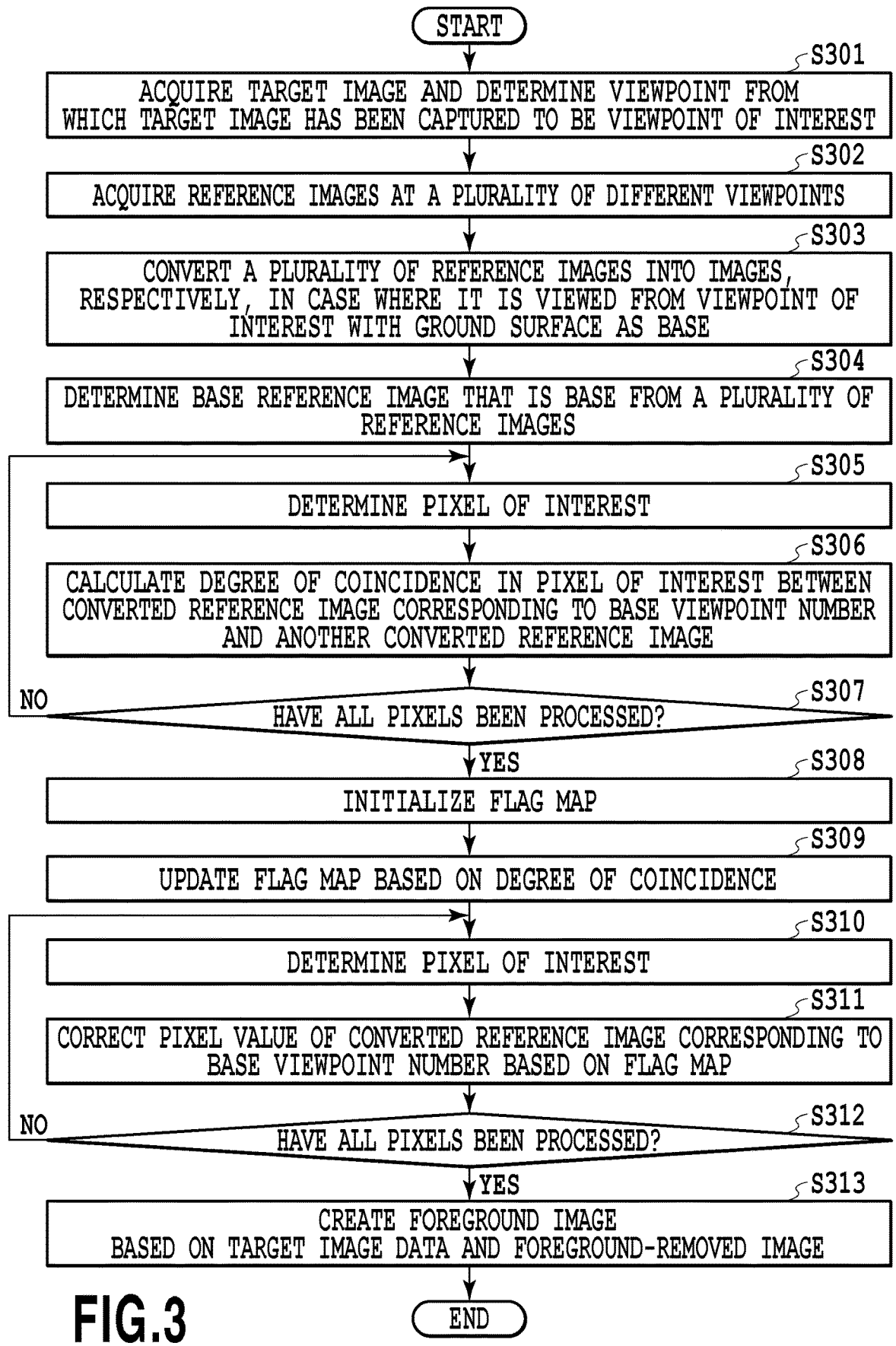
FIG. 3 is a flowchart showing a flow of processing to extract a foreground area in the first embodiment.

In the following, processing to extract a foreground area that is performed by the image processing apparatus 100 in the present embodiment is explained by using FIG. 2 and FIG. 3. FIG. 2 is a block diagram showing a function configuration of the image processing apparatus 100 and FIG. 3 is a flowchart showing a flow of the processing to extract a foreground area. The CPU 101 of the image processing apparatus 100 functions as each component shown in FIG. 2 and performs a series of processing shown in FIG. 3 by executing programs stored in the ROM 103 by using the RAM 102 as a work memory. All the processing shown below does not need to be performed by the CPU 101 and it may also be possible to make up the image processing apparatus 100 so that part or all of the processing is performed by one or a plurality of processing circuits other than the CPU 101.

In the following, a flow of processing that is performed by each component is explained. At step S301, a target image acquisition unit 201 acquires a target image from the external storage device 108 via the input interface 105, or from the secondary storage device 104. As described above, the target image is an image that is a target from which a foreground area is extracted. Further, the target image acquisition unit 201 determines the viewpoint of a camera that has captured the target image to be a viewpoint of interest. Furthermore, in the present embodiment, the case is explained where there is one target image, but the number of target images may be two or more. Still furthermore, the target image acquisition unit 201 acquires parameters of a camera (hereinafter, camera parameters) that has captured the target image along with the target image. Here, the camera parameters are parameters that enable a calculation to project a point in the three-dimensional space onto an image captured by a camera and include external parameters representing the position and the attitude of a camera and internal parameters representing the focal length and the optical center. It may also be possible to use measured values and design values stored in advance on the memory as camera parameters. The target image acquisition unit 201 outputs the target image to a foreground extraction unit 207 and outputs the camera parameters to an image conversion unit 203.

At step S302, a reference image acquisition unit 202 acquires a plurality of reference images at a plurality of different viewpoints from the external storage device 108 via the input interface 105, or from the secondary storage device 104. Here, the reference image is an image based on photographing in an environment (weather, time zone, and so on) substantially the same as the environment at the time of capturing the target image. As described above, the reference image that is acquired at this step does not need to be a background image that does not in the least include a foreground image. Further, in the reference image that is acquired at step S302, an image based on the viewpoint of interest may be included or may not be included.

In the present embodiment, a reference image at each viewpoint is created by performing filter processing using a mean value filter for a plurality of images corresponding to a plurality of different times acquired by continuously capturing the images of a scene from the same viewpoint along a time series. However, the method of creating a reference image is not limited to this method. For example, it may also be possible to create a reference image by using another filter, such as an average value filter or to create a reference image by performing clustering processing for a plurality of images. Further, it may also be possible to use a reference image acquired by performing image capturing in advance in the state where no foreground object exists for each viewpoint.

The reference image acquisition unit 202 acquires the camera parameters corresponding to each reference image along with the reference image. Further, the reference image acquisition unit 202 stores each reference image in association with a number to distinguish the viewpoint of a camera from another (hereinafter, camera viewpoint number) in order to distinguish a reference image from another in the plurality of reference images. The reference image acquisition unit 202 outputs the reference image and the camera parameters to the image conversion unit 203 and outputs only the reference image to a correction unit 206.

At step S303, the image conversion unit 203 converts the reference image acquired from the reference image acquisition unit 202 into an image in the case where the reference image is viewed from the viewpoint of interest by using the camera parameters acquired from the target image acquisition unit 201 and the reference image acquisition unit 202. Specifically, by performing projection conversion for each reference image with the ground surface as a base, the image in the case where the reference image is viewed from the viewpoint of interest is obtained. The reference image (data) obtained by the image conversion at this step is called a converted reference image (data). Here, the method of the image conversion at this step is explained by using FIG. 5.

Figure 5:
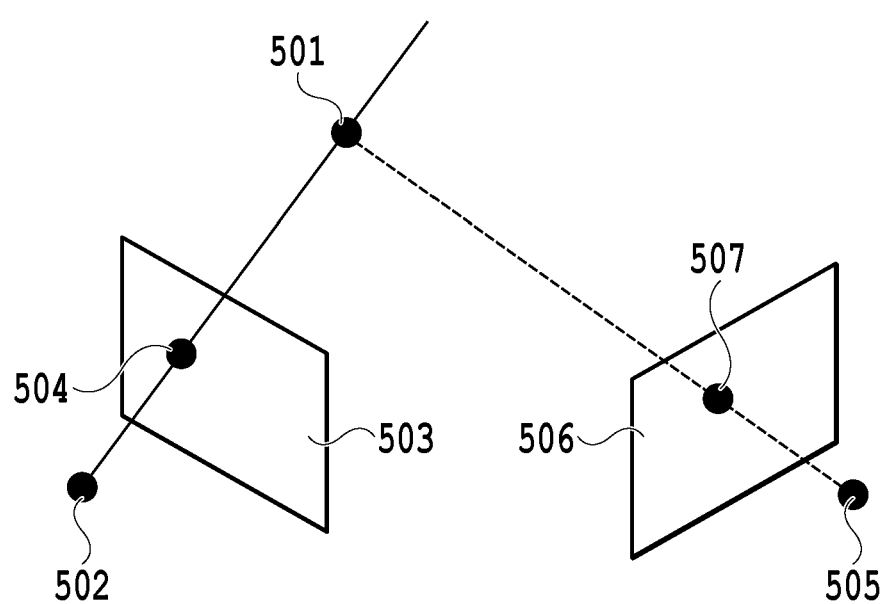
FIG. 5 is a diagram explaining image conversion in the first embodiment.

As shown in FIG. 5, in the case where a point 501 in the three-dimensional space is projected onto an image of a camera 502, a point 504 that is an intersection of a straight line connecting the point 501 and the camera 502, and an image plane 503 is a projected image of the point 501 in the three-dimensional space onto the image plane 503. Similarly, in the case of a camera 505 (camera with a different viewpoint) existing at a position different from that of the camera 502, a point 507 that is an intersection of a straight line connecting the point 501 and the camera 505, and an image plane 506 is a projected image of the point 501 onto the image plane 506. Here, a case is discussed where all the points in the three-dimensional space projected onto the image plane 503 and the image plane 506 including the point 501 exist on the same plane, which is the ground surface. In this case, by using a 3×3 nomography matrix $H_{01}$ calculated by the camera parameters of the camera 502 and the camera 505, arbitrary coordinates $(u_0, v_0)$ on the image plane 503 are converted into coordinates $(u_1, v_1)$ on the image plane 506 by expression (1).

$$\begin{bmatrix} u_1 \\ v_1 \\ 1 \end{bmatrix} = H_{01} \begin{bmatrix} u_0 \\ v_0 \\ 1 \end{bmatrix} \quad \text{expression (1)}$$

At step S303, projection conversion taking the camera with the viewpoint corresponding to the reference image acquired from the reference image acquisition unit 202 to be the above-described camera 502 and the camera with the viewpoint of interest determined by the target image acquisition unit 201 to be the camera 505 is performed for each reference image. Because of this, the number of converted reference images acquired at this step is the same as the number of reference images acquired by the reference image acquisition unit 202. Further, each of the converted reference images is stored in association with the viewpoint number of each reference image acquired by the reference image acquisition unit 202. The image conversion unit 203 outputs the converted reference image to a coincidence degree calculation unit 204 and the correction unit 206.

At step S304, the image conversion unit 203 determines an image among the reference images acquired from the reference image acquisition unit 202, which corresponds to the viewpoint closest to the camera viewpoint (viewpoint of interest) from which the target image is captured, to be a base reference image. Specifically, a distance between coordinates $(Xo, Yo, Zo)$ of the viewpoint of interest and coordinates $(Xi, Yi, Zi)$ of the viewpoint corresponding to the reference image acquired from the reference image acquisition unit 202 is calculated for each viewpoint. Here, i represents the viewpoint number and $1 \leq i <$ number of viewpoints+1 holds. Then, the viewpoint (base viewpoint) whose calculated distance is the shortest is detected and the reference image (data) corresponding to the base viewpoint is taken to be the base reference image (data). The image conversion unit 203 outputs the viewpoint number corresponding to the base reference image to the coincidence degree calculation unit 204 and the correction unit 206. In the present embodiment, the viewpoint number corresponding to the base reference image is called the base viewpoint number. It may also be possible for the viewpoint of interest and the viewpoint of the base reference image to coincide perfectly with each other.

At step S305, the coincidence degree calculation unit 204 determines a pixel of interest in the converted reference image, which will be the target of the determination of the degree of coincidence of the pixel value in the plurality of converted reference images. In the present embodiment, first, the top-left pixel of the base reference image is selected as the pixel of interest and after this, unprocessed pixels are sequentially selected as the pixel of interest. As long as the determination of the degree of coincidence of the pixel value in the plurality of converted reference images is performed for all the pixels of the base reference image, the pixel of interest may be determined in any order. Further, in the present embodiment, the example of the case is explained mainly where data relating to the degree of coincidence is obtained for all the pixels of the base reference image, but the example is not limited to this. For example, in the case where the area that is the target of extraction of a foreground object is determined in advance, it is sufficient to obtain data relating to the degree of coincidence only for the pixels belonging to the area. For example, in the case where it is not necessary to extract the foreground object from the spectator stand of soccer, it is not necessary to perform processing to obtain data relating to the degree of coincidence for the area of the spectator stand.

At step S306, the coincidence degree calculation unit 204 calculates the degree of coincidence in the pixel of interest between the converted reference image (base reference image) corresponding to the base viewpoint number and another converted reference image by using the plurality of converted reference images acquired from the image conversion unit 203. In the following, the calculation method of the degree of coincidence is explained specifically.

First, the coincidence degree calculation unit 204 acquires a pixel value $B_j (u_2, v_2)$ of a plurality of converted reference images at coordinates $(u_2, v_2)$ of the pixel of interest on the base reference image. Here, j represents a subscript to distinguish a converted reference image from another in the plurality of converted reference images and the coincidence degree calculation unit 204 acquires pixel values in the number corresponding to the number of converted reference images. Next, the coincidence degree calculation unit 204 calculates a mean value of all the acquired pixel values. This mean value is used as a base value M at the time of calculation of the degree of coincidence. The base value is not limited to this and it may also be possible to use an arbitrary value, such as an average value, which reflects the statistical nature of a plurality of pixel values as a base value.

Next, the coincidence degree calculation unit 204 calculates the degree of coincidence in the pixel of interest from expression (2) by using a pixel value $B_0(u_2, v_2)$ of the pixel of interest in the converted reference image (base reference image) corresponding to the base viewpoint number and a calculated base value $M(u_2, v_2)$.

$$D(u_2, v_2) = \sum_{k=1}^{3} \left(B_0^k(u_2, v_2) - M^k(u_2, v_2)\right)^2 \qquad \text{expression (2)}$$

Here, k represents a subscript to identify the three channels of RGB. A degree of coincidence D that is calculated by expression (2) becomes smaller in the case where the fluctuations in the pixel value in the plurality of converted reference images are smaller. The degree of coincidence that is used is not limited to this and it may also be possible to use an arbitrary value indicating a difference between pixels. For example, it may also be possible to use the total sum of differences between the pixel value $B_0(u_2, v_2)$ of the pixel of interest in the base reference image and the pixel value of the pixel of interest in another converted reference image as the degree of coincidence. That is, the coincidence degree calculation unit 204 obtains the data relating to the degree of coincidence of the pixel value of the plurality of converted reference images at steps S305 to S307. In the present embodiment, the example is shown in which the data relating to the degree of coincidence of the pixel of interest on the base reference image is calculated by using the pixel values of all the converted reference images, but the example is not limited to this. For example, it may also be possible to obtain the data relating to the degree of coincidence by not using the pixel value of the converted reference image in which the pixel of interest is not photographed among the plurality of converted reference images. Further, in the present embodiment, the example is shown in which the data relating the degree of coincidence is calculated for each pixel, but it may also be possible to calculate the data relating to the degree of coincidence for each area, such as a block. In the case where the degree of coincidence is calculated for each pixel, it is possible to further improve the extraction accuracy of a foreground object and in the case where the degree of coincidence is calculated for each area, it is possible to reduce the load of the extraction processing of a foreground object.

At step S307, the coincidence degree calculation unit 204 determines whether the processing at step S305 and step S306 has been performed for all the pixels of the converted reference image. In the case where the results of the determination at step S307 are affirmative, the coincidence degree calculation unit 204 outputs the calculated degrees of coincidence of all the pixels to a correction determination unit 205 and outputs the calculated base value to the correction unit 206 and the processing advances to step S308. On the other hand, in the case where the results of the determination at step S307 are negative, the processing returns to step S305.

At step S308, the correction determination unit 205 initializes the flag map, i.e., sets the pixel values of all the pixels of the flag map to 0. The flag map that is initialized at this step is used to determine the pixel that is the target of the correction processing at the time of correcting the pixel of the converted reference image (base reference image) corresponding to the base viewpoint number at step S311. In this flag map, 1 is substituted for the pixel value corresponding to the pixel of the target of the correction processing and 0 is substituted for the pixel value corresponding to the pixel that is not the target of the correction processing. By the initialization at this step, all the pixels of the converted reference image corresponding to the base viewpoint number are set to those which are not the target of the correction processing.

At step S309, the correction determination unit 205 updates the flag map based on the degree of coincidence acquired from the coincidence degree calculation unit 204. Specifically, the correction determination unit 205 changes the pixel value of the flag map to 1, which corresponds to the pixel regarded as having a strong possibility of being the pixel of the image area of the foreground object in the converted reference image (base reference image) corresponding to the base viewpoint number. In the present embodiment, it is determined that the pixel whose degree of coincidence D is higher than or equal to a threshold value determined in advance has a strong possibility of being the pixel of the foreground object because the degree of coincidence between the pixel of the base reference image and the pixel of another converted reference image is low. On the other hand, it is determined that the pixel whose degree of coincidence D is lower than the threshold value has a strong possibility of being the pixel of the image area of the background because the degree of coincidence between the pixel of the base reference image and the pixel of another converted reference image is high. The threshold value that is used at this step is determined based on the maximum value or the like of the pixel value and the threshold value is determined by using a value smaller than 20% of the maximum value, for example, an arbitrary value within a range of 1% to 5% of the maximum value. That is, in the case where an arbitrary value is taken to be a, in expression (2), the difference square sum is used as the degree of coincidence, and therefore, the threshold value will be a×a×3. In the case where the total sum of differences is used as the degree of coincidence, the threshold value will be a×3. By taking the threshold value to be a variable value as described above, the extraction accuracy of a foreground object further improves. However, it may also be possible to set the threshold value to a fixed value. In the present embodiment, determination of whether the pixel of interest is the pixel of the image area of the foreground object is performed for each pixel. However, this is not limited and it may also be possible to perform determination for each area, such as a block. By doing so, it is possible to reduce the processing load relating to the extraction of a foreground object. The correction determination unit 205 outputs the flag map for which updating has been completed to the correction unit 206.

At step S310, the correction unit 206 determines a pixel of interest in the base reference image. In the present embodiment, first, the top-left pixel of the base reference image is selected as the pixel of interest and after this, unprocessed pixels are sequentially selected as the pixel of interest. As long as the updating (step S311) of the pixel value based on the flag map is performed for all the pixels of the base reference image, the pixel of interest may be determined in any order. Further, it is not necessarily required to perform the processing at step S310 for all the pixels of the base reference image. For example, in the case where the area in which the foreground object cannot exist is selected in advance by a user, it is not necessary to generate a flag map for the selected area and it is not necessary to perform the processing at step S310.

At step S311, the correction unit 206 corrects the pixel value of the pixel of interest in the converted reference image corresponding to the base viewpoint number based on the flag map acquired from the correction determination unit 205. In the present embodiment, in the case where the pixel value of the flag map corresponding to the pixel of interest in the converted reference image corresponding to the base viewpoint number is 1, the pixel value of the pixel of interest is replaced with the base value calculated by the coincidence degree calculation unit 204. On the other hand, in the case where the pixel value of the flag map corresponding to the pixel of interest in the converted reference image corresponding to the base viewpoint number is 0, the pixel value of the pixel of interest is not changed. The base value is, for example, a mean value or an average value of pixel values of a plurality of reference images, or an arbitrary value reflecting another statistical nature. The method of correcting a pixel value is not limited to this, and it may also be possible to use another method, such as a method of replacing a pixel value with another pixel value of a background image corresponding to the viewpoint adjacent to the base viewpoint.

At step S312, the correction unit 206 determines whether the processing at step S5310 and step 311 has been performed for all the pixels of the base reference image. In the case where the results of the determination at step S312 are affirmative, the correction unit 206 outputs the base reference image for which the correction has been completed to the foreground extraction unit 207 and the processing advances to step S313. On the other hand, in the case where results of the determination are negative, the processing returns to step S310.

At step S313, the foreground extraction unit 207 extracts a foreground object from a target image (taken to be I) by using a base reference image (taken to be a foreground-removed image $I_b$) acquired from the correction unit 206, for which the correction has been completed. Specifically, as expressed by expression (3), the difference square sum is calculated for each pixel between the foreground-removed image $I_b$ and the target image I and by regarding the pixel whose difference square sum is larger than or equal to a threshold value as the pixel of the image area of the foreground object, an image $I_f$ in which the foreground object is extracted is created. The image $I_f$ is a binary image and 1 is substituted for the pixel value corresponding to the pixel of the image area of the foreground object and 0 is substituted for the pixel value corresponding to the pixel of the image area of the foreground.

$$I_f(x, y) = \begin{cases} 1 & \text{if } \sum_{k=1}^{3}(I_b^k(x, y) - I^k(x, y))^2 \geq Th \\ 0 & \text{if } \sum_{k=1}^{3}(I_b^k(x, y) - I^k(x, y))^2 < Th \end{cases} \quad \text{expression (3)}$$

Here, Th represents a threshold value and k represents a subscript to identify the three channels of RGB. The threshold value that is used here is determined based on the maximum value or the like of the pixel value and it may also be possible to find the threshold value by using a value smaller than 20% of the maximum value of the pixel value, for example, by using an arbitrary value within a range of 1% to 5% of the maximum value. The method of finding the threshold value is the same as that in the case of expression (2). The foreground extraction unit 207 outputs the created image $I_f$ to the secondary storage device 104, the external storage device 108, and the display device 109 and then the series of processing is completed. The above is the processing to extract a foreground area that is performed by the image processing apparatus 100 in the present embodiment.

About Effects of the Present Embodiment

Figure 6:
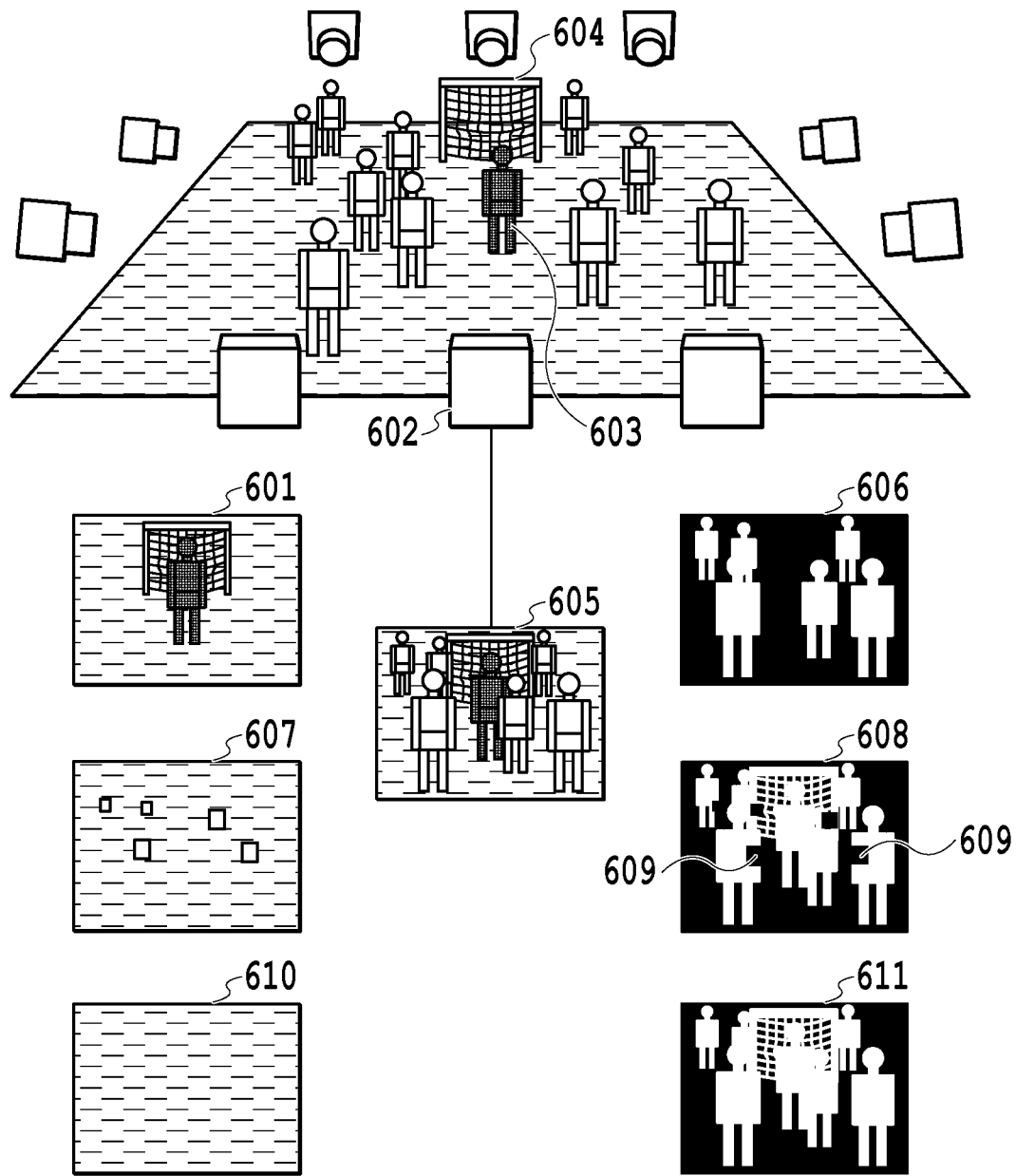
FIG. 6 is a diagram explaining effects of the first embodiment.

In the following, effects of the present embodiment are explained by using FIG. 6. In FIG. 6, an image 601 is a background image at a viewpoint 602, which is created based on a plurality of images captured continuously along a time series in accordance with a conventional method. In the background image 601, a foreground object 603 (goal keeper), a foreground object 604 (goal), and so on are photographed. The reason is that the foreground objects 603 and 604 continue to exist at the same position and do not move while capturing continuous images to create a reference image, and as a result of this, the foreground objects 603 and 604 are erroneously regarded as the background at the time of creating a background image. In the case where the foreground area is extracted from a target image 605 by using the background image 601, a foreground image 606 is acquired. In the foreground image 606, the foreground objects that are moving, other than the foreground objects 603 and 604, are almost extracted. However, the area of the foreground objects 603 and 604 that are stationary is not extracted.

Further, an image 607 is a background image at the viewpoint 602, which is created based on a plurality of images captured from a plurality of different viewpoints at the same point in time as that at which the target image 605 is captured in accordance with the conventional method. In the background image 607, the foreground objects, such as the foreground object 603 (goal keeper) and the foreground object 604 (goal), are not photographed, but part of the background is missing. The reason is that the foreground objects cluster together within the scene whose image is captured to create a background image, and therefore, part of the background object is not seen from any viewpoint. In the case where the foreground area is extracted from the target image 605 by using the background image 607, a foreground image 608 is acquired. In the foreground image 608, the foreground objects having an altitude from the ground surface are almost extracted. However, foreground objects 609 that are not seen from a plurality of viewpoints because the foreground objects cluster together are not extracted.

In contrast to this, in the present embodiment, by using reference images (e.g., the reference image 601 and the like) at a plurality of different viewpoints, a reference image 610, which is a foreground-removed image, is created. In the case where the foreground area is extracted from the target image 605 by using the reference image 610, a foreground image 611 is acquired. In the foreground image 611, the area of the stationary foreground objects 603 and 604, and the foreground objects that are not seen from a plurality of viewpoints are extracted with high accuracy. As above, according to the present embodiment, it is possible to extract foreground objects with high accuracy whether there is a change (movement or the like) of the foreground objects accompanying an elapse of time or not, and whether foreground objects cluster together or not.

Second Embodiment

A second embodiment is explained by focusing attention on differences from the first embodiment. In the first embodiment, at the time of creating a foreground-removed image based on a plurality of reference images, data indicating the degree of coincidence in the pixel of interest of a converted reference image that differs depending on the viewpoint is used. On the other hand, in the present embodiment, at the time of creating a foreground-removed image based on a plurality of reference images, in addition to the data indicating the degree of coincidence, the degree of smoothness of the change in the pixel value, i.e., so-called continuity, in the pixel of interest of a converted reference image that differs depending on the viewpoint is used. The same configuration and processing as those of the first embodiment are given the same symbols as those of the first embodiment, and explanation thereof is omitted.

<About Outline of Processing to Extract Foreground Area>

In the following, an outline of processing to extract a foreground area in the present embodiment is explained. In the present embodiment, by using converted reference images obtained by converting reference images at a plurality of different viewpoints into images in the case where the reference images are viewed from the viewpoint of interest, continuity in the pixel value between viewpoints is calculated. The continuity in the pixel value is the degree of smoothness of the change in the pixel value between the converted reference image at the viewpoint of interest and the converted reference image at the viewpoint adjacent to the viewpoint of interest.

Specifically, the pixel value of the pixel of interest in the converted reference image corresponding to the base viewpoint number and the pixel value of the pixel of interest in the converted reference image at the viewpoint adjacent to the base viewpoint are compared and the total sum of differences between the pixel values is calculated as continuity. Following this, by using the degree of coincidence explained in the first embodiment and the continuity calculated in the present embodiment, the pixel whose degree of coincidence is low and whose change in the pixel value is not smooth is regarded as having a strong possibility of being the pixel of the image area of the foreground object and the pixel is detected as a correction-target pixel. Then, by correcting the converted reference image by updating the pixel value of the detected correction-target pixel, a foreground-removed image is created. Finally, the created foreground-removed image and the target image are compared, and thereby, a foreground area is extracted.

In the first embodiment, by using only the degree of coincidence between the pixel values calculated based on the reference images at all the viewpoints, whether the pixel of interest is the pixel of the image area of the foreground object is determined. Because of this, the pixel of the image area of the background whose pixel value differs because the appearance of color changes depending on the viewpoint is also regarded as having a strong possibility of being the pixel of the image area of the foreground object, and therefore, the pixel is detected as a correction-target pixel. As a result of this, the pixel that does not need to be corrected is also corrected, and therefore, an error occurs in the converted reference image after the correction and there is a possibility that a foreground-removed image including a foreground object is created. As a background whose appearance changes depending on the viewpoint, mention is made of the lawn that is mowed with directionality, which exists in an image captured from a competitive game scene, such as a sport. The appearance of color of the lawn mowed with directionality differs depending on the direction in which the lawn is viewed and as a result of this, the pixel value of the lawn changes depending on the viewpoint even though the lawn is located at the same position. In the case where the first embodiment is applied to the scene whose background is the lawn such as this, the degree of coincidence between the pixels in the plurality of converted reference images becomes low, and therefore, the pixel of the image area of the lawn, which is the background, may be erroneously determined to be the pixel of the image area of the foreground object. In order to prevent such erroneous determination, in the present embodiment, whether the pixel of interest is the pixel of the image area of the foreground object is determined by using the continuity, in addition to the degree of coincidence. In general, for a subject whose appearance of color changes depending on the viewpoint, there is a case where a remarkable difference arises in the appearance of color between viewpoints distant from each other, but the change in appearance of color between viewpoints close to each other is gradual. Because of this, in the present embodiment, the pixel of the image area of the background whose pixel value has changed due to the difference in appearance of color is distinguished from the pixel of the image area of the foreground object whose pixel value has changed because of the possession of an altitude from the ground surface. As a result of this, it is possible to create a foreground-removed image by correcting the converted reference image with high accuracy, and therefore, it is made possible to extract a foreground object from a target image with high accuracy. The subject whose appearance of color changes depending on the viewpoint is not limited to the example of lawn described above, and there exist a variety of subjects, such as the floor of a gymnasium.

<About Processing to Extract Foreground Area>

Figure 7:
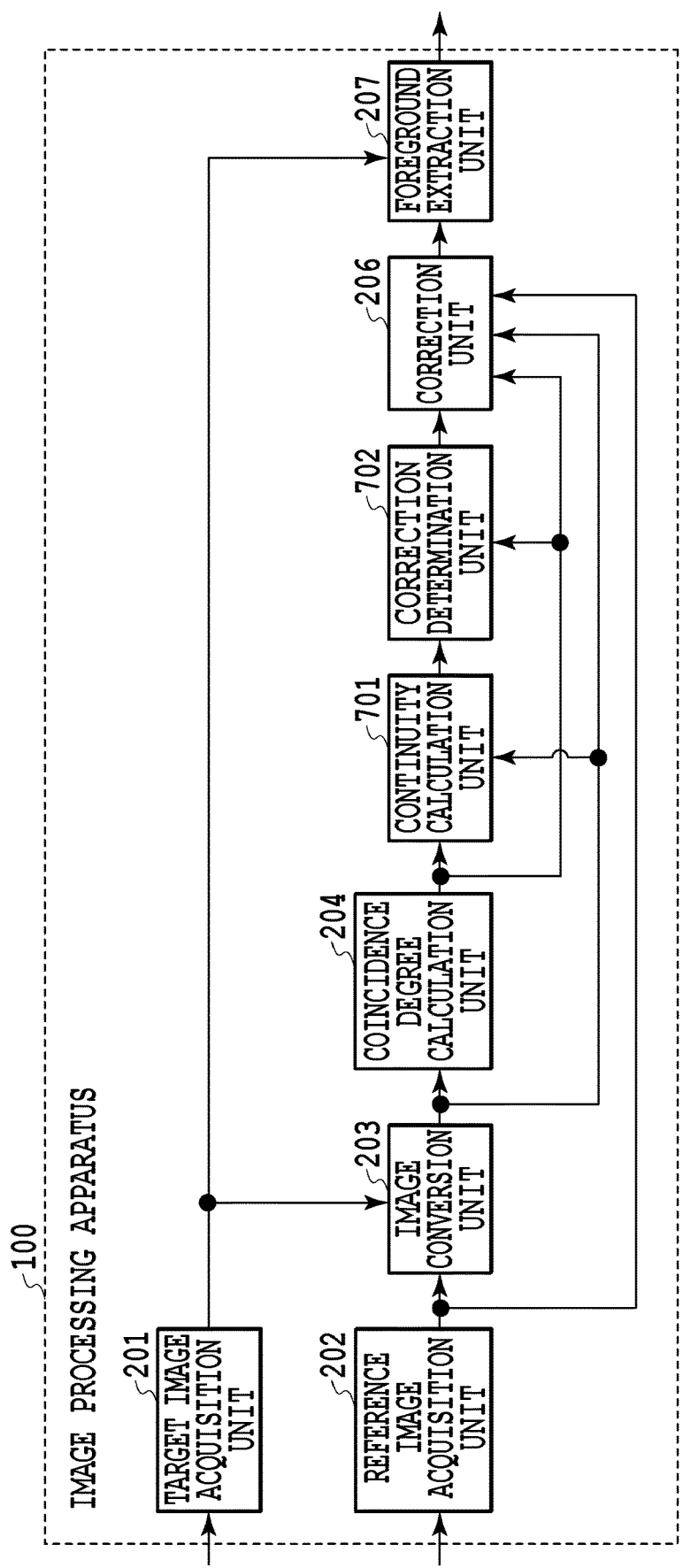
FIG. 7 is a block diagram showing a function configuration of the image processing apparatus in the second embodiment.
Figure 8:
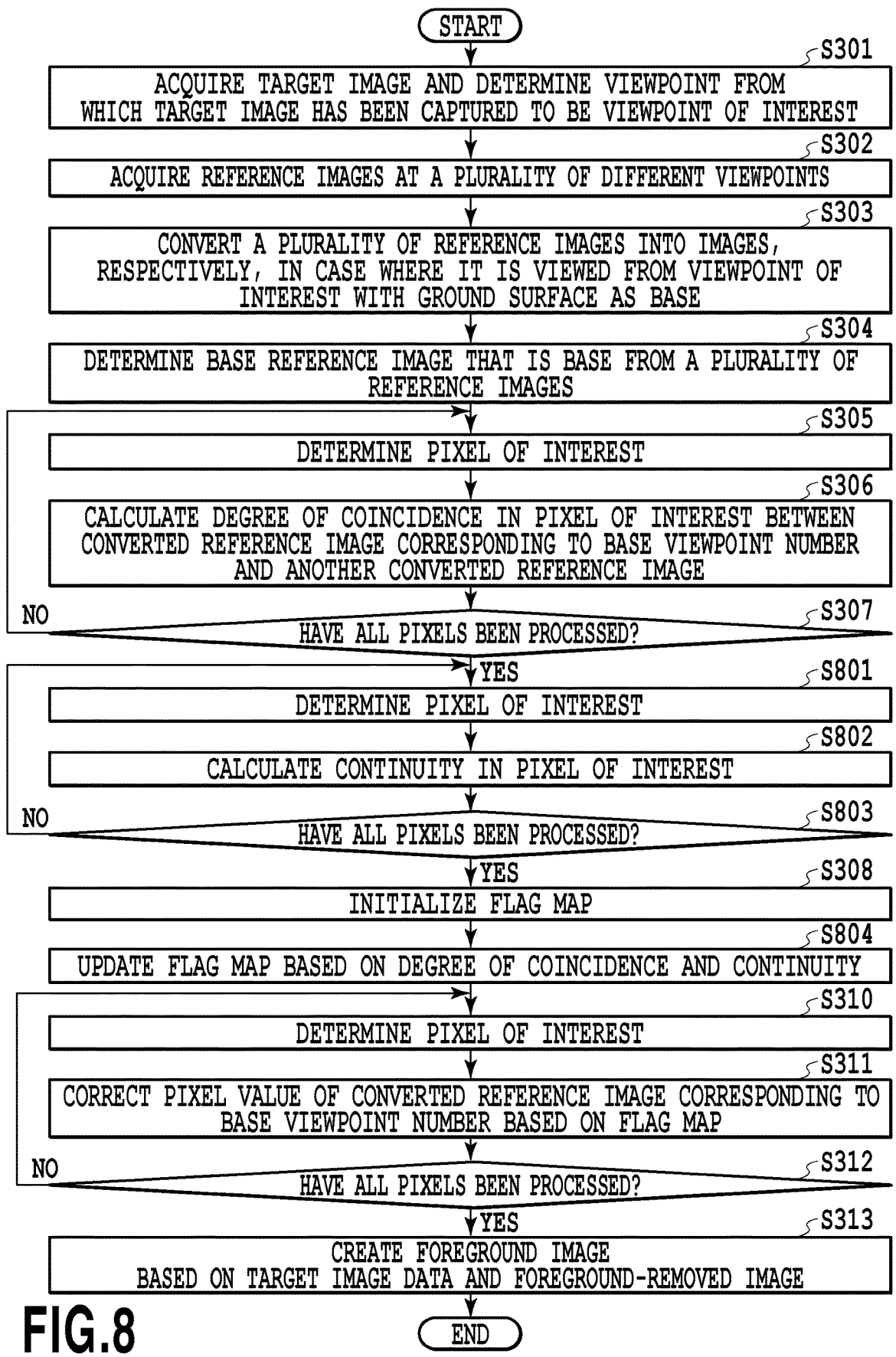
FIG. 8 is a flowchart showing a flow of processing to extract a foreground area in the second embodiment.

In the following, processing to extract a foreground area that is performed by the image processing apparatus 100 in the present embodiment is explained by using FIG. 7 and FIG. 8. FIG. 7 is a block diagram showing a function configuration of the image processing apparatus 100 in the present embodiment and FIG. 8 is a flowchart showing a flow of the processing to extract a foreground area in the present embodiment. The CPU 101 of the image processing apparatus 100 functions as each component shown in FIG. 7 and performs a series of processing shown in FIG. 8 by executing programs stored in the ROM 103 by using the RAM 102 as a work memory. All the processing shown below does not need to be performed by the CPU 101 and it may also be possible to make up the image processing apparatus 100 so that part or all of the processing is performed by one or a plurality of processing circuits other than the CPU 101.

At step S801, a continuity calculation unit 701 determines a pixel of interest in the base background image, which is the target for which continuity is calculated. In the present embodiment, first, the top-left pixel of the base background image is selected as the pixel of interest and after this, unprocessed pixels are sequentially selected as the pixel of interest. As long as the calculation of continuity is performed for all the pixels of the converted reference image, the pixel of interest may be determined in any order.

Figure 9:
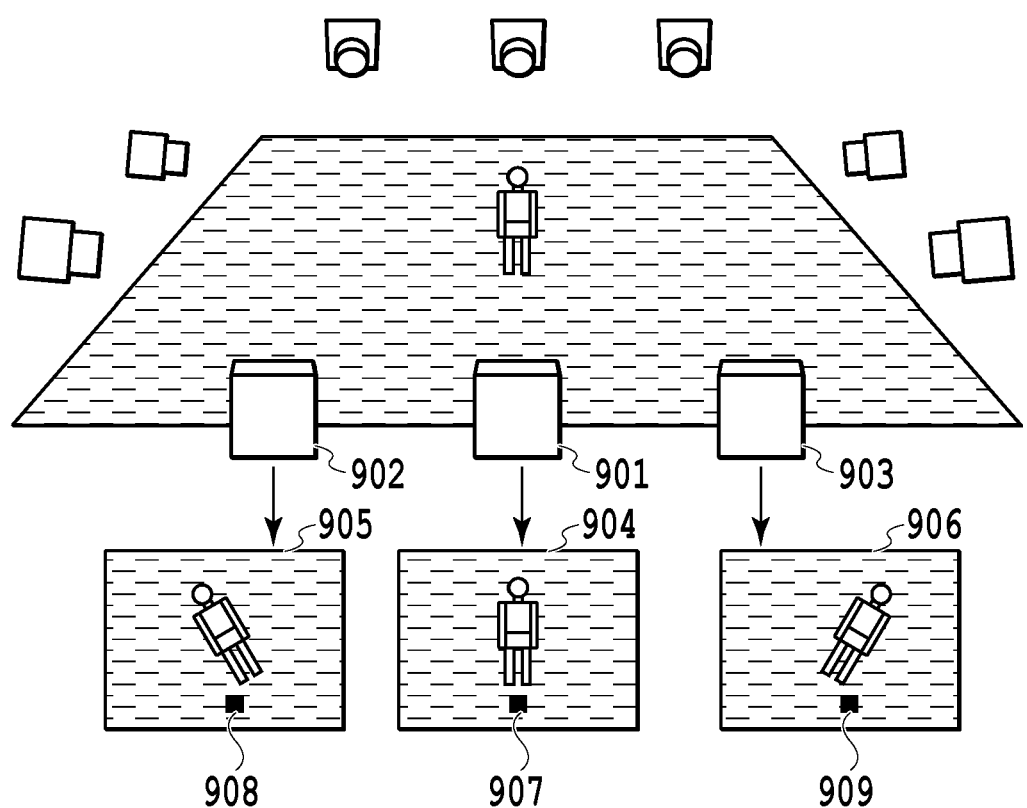
FIG. 9 is a diagram explaining a calculation method of continuity in the second embodiment.

At step S802, the continuity calculation unit 701 calculates continuity in the pixel value of the pixel of interest on the base background image by using a plurality of converted reference images (converted reference images corresponding to the base viewpoint and the viewpoints on the periphery thereof) acquired from the image conversion unit 203. Here, the calculation method of continuity at this step is explained by using FIG. 9.

First, cameras 902 and 903 adjacent to a camera 901 corresponding to the base viewpoint number determined by the image conversion unit 203 are detected and viewpoint numbers corresponding to these cameras are acquired. Hereinafter, the acquired viewpoint number is called an adjacent viewpoint number. Here, the camera adjacent to the camera 901 corresponding to the base viewpoint number is determined based on the distance to the camera 901, which is calculated from the coordinates in the three-dimensional space of the camera. In the present embodiment, the camera 902 whose distance to the camera 901 is the shortest among the cameras existing on the left side of the camera 901, and the camera 903 whose distance to the camera 901 is the shortest among the cameras existing on the right side of the camera 901 are detected as the cameras adjacent to the camera 901. However, the camera closest to the camera corresponding to the base viewpoint number is not necessarily selected as the adjacent viewpoint camera. For example, it may also be possible to select an adjacent viewpoint camera in accordance with the photographing direction of each camera or various parameters, such as the resolution and the focus, of the camera.

Next, from a converted reference image 904 corresponding to the base viewpoint number and converted reference images 905 and 906 corresponding to the adjacent viewpoint numbers, the pixel values of pixels 907, 908, and 909 at the coordinates (u2, v2) of the pixels of interest are acquired and by using the acquired pixel values, continuity is calculated by expression (4).

$$C(u_2,v_2)=\Sigma_{k=1}^{3}|B_{901}^{k}(u_2,v_2)-B_{902}^{k}(u_2,v_2)|+|B_{902}^{k}(u_2,v_2)-B_{903}^{k}(u_2,v_2)|$$ expression (4)

Here, each of $B_{901}(u_2, v_2)$, $B_{902}(u_2, v_2)$, and $B_{903}(u_2, v_2)$ represents the pixel value of the pixels of interest 907, 908, and 909 in the converted reference images 904, 905, and 906 corresponding to the cameras 901, 902, and 903. Further, k represents a subscript to identify the three channels of RGB. The value of C calculated by expression (4) becomes smaller as the change in the pixel value between viewpoints is smoother. The continuity that is used is not limited to C calculated by expression (4) and it may also be possible to use any value that indicates continuity in the pixel value between viewpoints, such as the secondary differential obtained from discrete values. Further, in the present embodiment, the case is explained where the cameras 902 and 903 adjacent to the camera 901 corresponding to the base viewpoint number are used, but the cameras that are used are not limited to these and it may also be possible to use another camera depending on the appearance of a subject. For example, it may also be possible to use the camera whose distance to the camera 901 is the second shortest, next to the camera 902, on the left side of the camera 901 corresponding to the base viewpoint number in place of the camera 902. This is also true with the camera that is used on the right side of the camera 901.

At step S803, the continuity calculation unit 701 determines whether the processing at step 801 and step S802 has been performed for all the pixels of the base reference image. In the case where the results of the determination at step S803 are affirmative, the continuity calculation unit 701 outputs the calculated continuity of all the pixels to a correction determination unit 702 and the processing advances to step S308. On the other hand, in the case where the results of the determination are negative, the processing returns to step S801.

At step S804, the correction determination unit 702 updates the flag map based on the degree of coincidence acquired from the coincidence degree calculation unit 204 and the continuity acquired from the continuity calculation unit 701. Specifically, the correction determination unit 702 changes the pixel value of the flag map to 1, which corresponds to the pixel regarded as having a strong possibility of being the pixel of the image area of the foreground object in the base reference image (converted reference image corresponding to the base viewpoint number). In the present embodiment, in the case where the calculated degree of coincidence D is higher than or equal to a threshold value determined in advance and the calculated continuity C is higher than or equal to a threshold value determined in advance, it is determined that the degree of coincidence and the degree of smoothness of the change in the pixel of interest between the converted reference image corresponding to the base viewpoint number and another converted reference image are low. That is, it is determined that the possibility that the pixel of interests is the pixel of the image area of the foreground object is high. On the other hand, in the case where these conditions are not satisfied, it is determined that the possibility that the pixel of interest is the pixel of the image area of the background is high. The threshold value that is used at this step is determined based on the maximum value or the like of the pixel value and it may also be possible to find the threshold value by using a value smaller than 20% of the maximum value, for example, by using an arbitrary value within a range of 1% to 5% of the maximum value. The method of finding the threshold value is the same as that of the first embodiment. Further, the determination of whether the pixel of interest is the pixel of the image area of the foreground object is performed for each pixel. However, that it is not necessarily required to perform the determination for each pixel is the same as that described also in the first embodiment. The correction determination unit 702 outputs the flag map for which the updating has been completed to the correction unit 206. The above is the processing to extract a foreground area that is performed by the image processing apparatus 100 in the present embodiment.

<About Effects of the Present Embodiment>

In the following, effects of the present embodiment are explained by using FIG. 10. An image 1002 is a converted reference image acquired by converting the reference image, for each viewpoint, into an image in the case where the reference image is viewed from a viewpoint 1001 with the ground surface as a base. Here, it is assumed that the viewpoint 1001 is the viewpoint of interest and is also the base viewpoint. Further, 1003 indicates a background (e.g., lawn) whose appearance of color changes depending on the viewpoint and 1005 indicates a foreground object.

Figure 10:
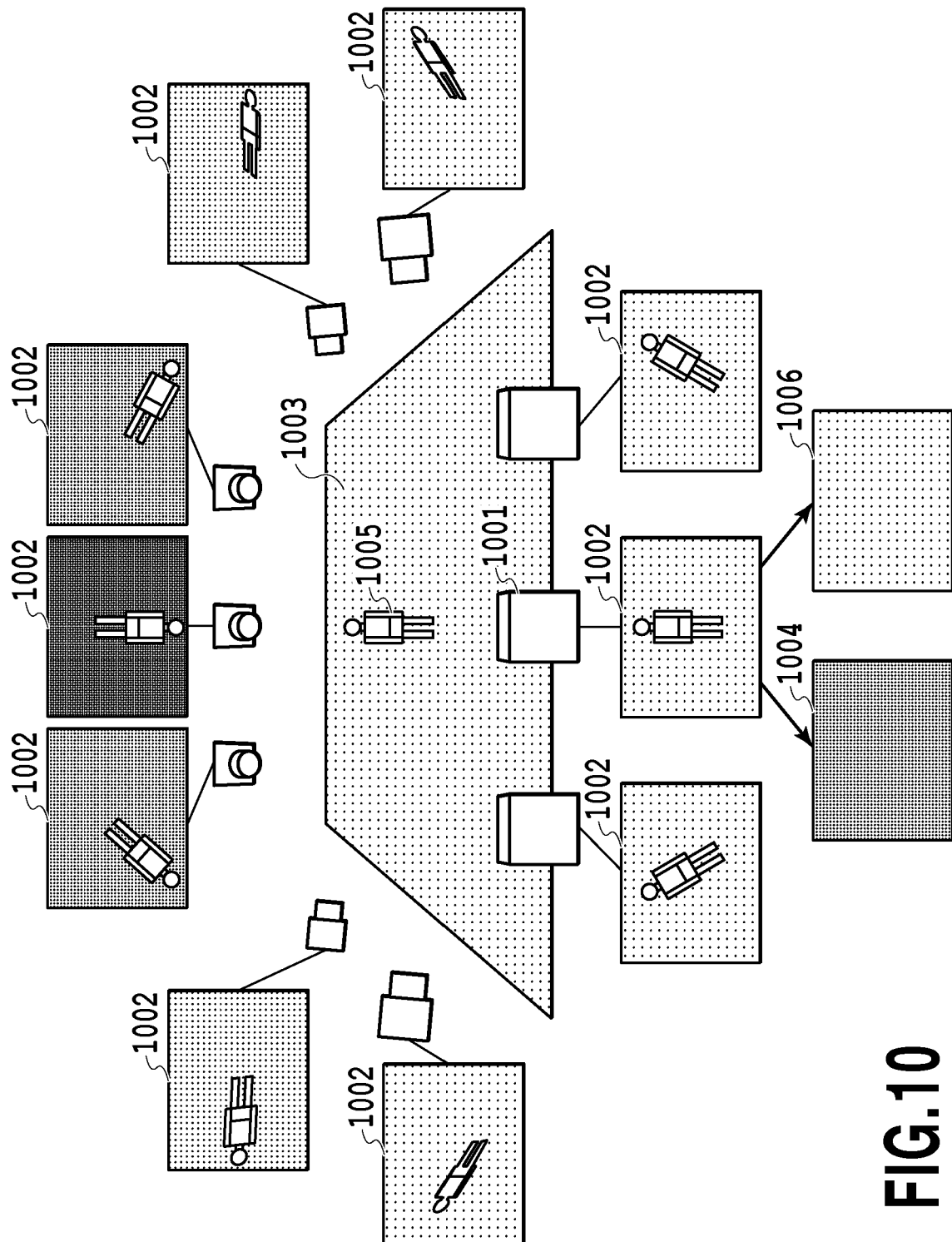
FIG. 10 is a diagram explaining effects of the second embodiment.

In the case where a foreground-removed image is created based on reference images at a plurality of viewpoints by applying the first embodiment to a scene shown in FIG. 10, a reference image 1004 is acquired. In the reference image 1004, the foreground object 1005 is removed, but the background 1003 is not photographed correctly. The reason is that at the time of creating the foreground-removed image, whether the pixel of interest is the pixel of the image area of the foreground object is determined by using the degree of coincidence but not using continuity, and therefore, the pixel of the image area of the background 1003 is determined to be the pixel of the foreground object. As a result of this, the reference image 1004 in which the pixel of the image area of the background 1003 has been corrected is created. Even in the case where an attempt is made to extract the foreground area from the target image by using the reference image 1004, it is not possible to extract the foreground area with high accuracy.

In contrast to this, in the present embodiment, at the time of creating the foreground-removed image based on reference images at a plurality of viewpoints, whether the pixel of interest is the pixel of the image area of the foreground object is determined based on the degree of coincidence and continuity. As a result of this, the pixel of the image area of the background 1003 is not determined to be the pixel of the image area of the foreground object, and therefore, a reference image 1006 in which the pixel of the image area of the background 1003 has not been corrected is created. In the reference image 1006, the foreground object 1005 is removed and the background 1003 is photographed correctly. By extracting the foreground area from the target image by using the reference image 1006, it is made possible to extract the foreground area with high accuracy. As described above, according to the present embodiment, even in the case where the background is a subject whose appearance of color changes depending on the viewpoint, it is possible to extract a foreground object with high accuracy.

Third Embodiment

In the first embodiment and the second embodiment, a foreground object is extracted by creating a foreground-removed image based on reference images at a plurality of different viewpoints and by comparing the created foreground-removed image with a target image. On the other hand, in the present embodiment, a foreground area not including a shadow area is extracted by using imperfect foreground images at a plurality of different viewpoints. Here, the imperfect foreground image means an image in which the area of a foreground object and a shadow accompanying the foreground object is extracted as a foreground area.

In the present embodiment, by converting the imperfect foreground image for each viewpoint into an image in the case where the imperfect foreground image is viewed from the viewpoint of interest with the ground surface as a base, a plurality of converted foreground images is acquired and the degree of coincidence between pixels is calculated in the acquired plurality of converted foreground images. As explained in the first embodiment, the foreground object has an altitude from the ground surface but the shadow that accompanies the foreground object does not have an altitude from the ground surface. Consequently, in the present embodiment, the pixel whose degree of coincidence between pixels is high in the plurality of converted foreground images is detected and the detected pixel is corrected by regarding that the detected pixel has a strong possibility of being the pixel of the shadow area not having an altitude. As a result, it is possible to create a foreground image in which only the foreground object having an altitude is extracted as the foreground area without extracting the shadow area. Hereinafter, the image in which the foreground object having an altitude is extracted without extracting the shadow area is called a shadow-removed foreground image. The same configuration and processing as those of the above-described embodiments are given the same symbols as those of the above-described embodiments and explanation thereof is omitted.

<About Processing to Extract Foreground Area>

Figure 11:
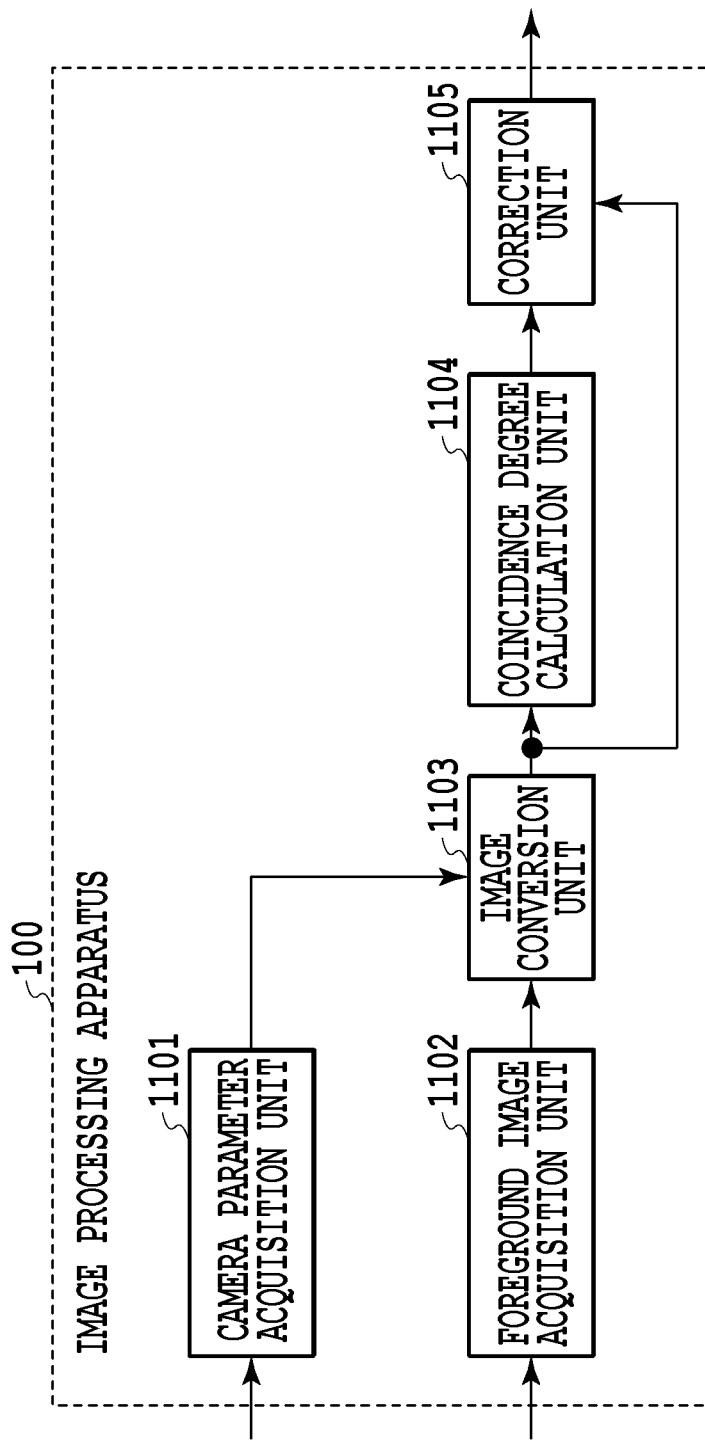
FIG. 11 is a block diagram showing a function configuration of the image processing apparatus in the third embodiment.
Figure 12:
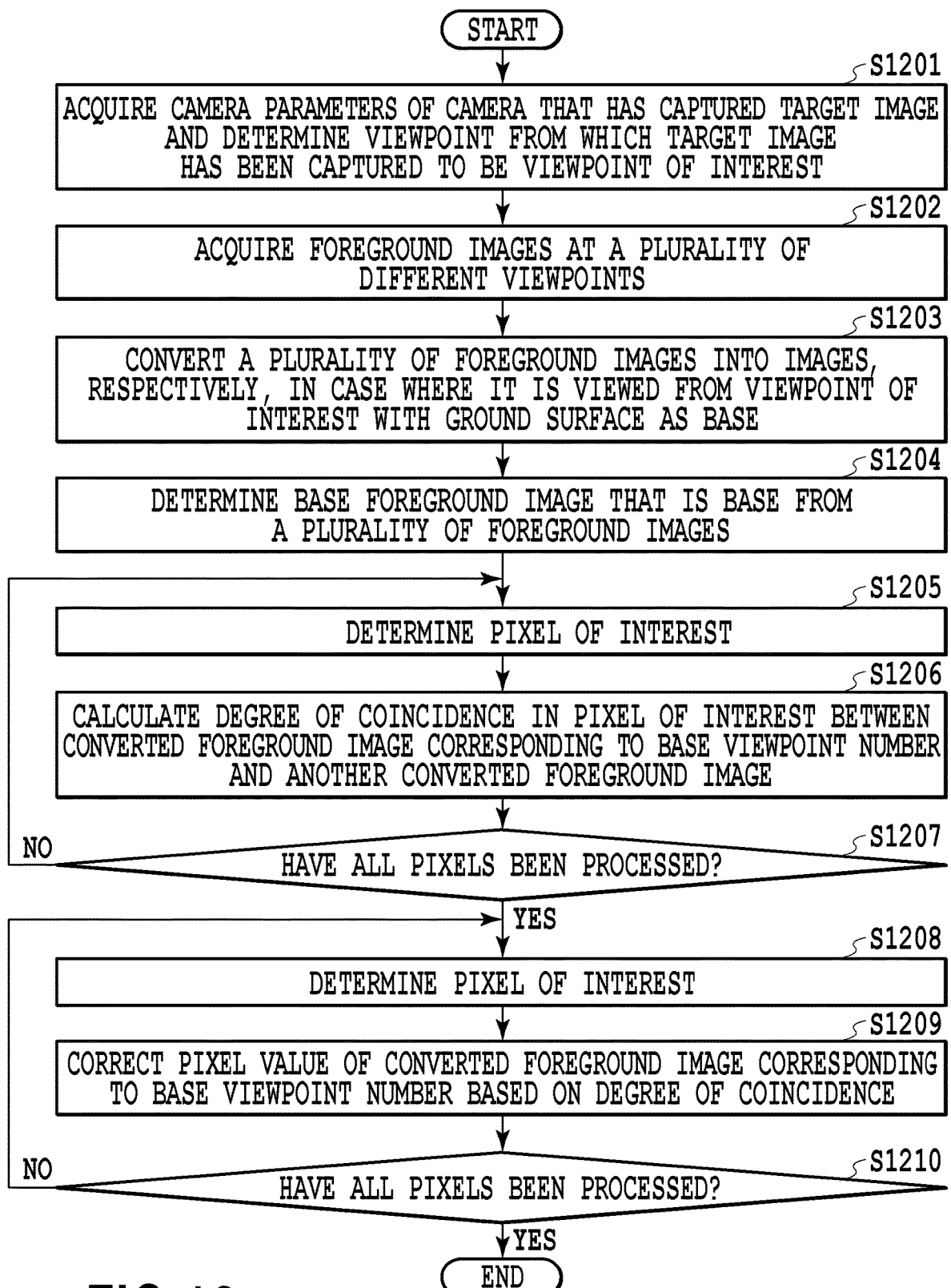
FIG. 12 is a flowchart showing a flow of processing to extract a foreground area in the third embodiment.

In the following, processing to extract a foreground area that is performed by the image processing apparatus 100 in the present embodiment is explained by using FIG. 11 and FIG. 12. FIG. 11 is a block diagram showing a function configuration of the image processing apparatus 100 in the present embodiment and FIG. 12 is a flowchart showing a flow of the processing to extract a foreground area in the present embodiment. The CPU 101 of the image processing apparatus 100 functions as each component shown in FIG. 11 and performs a series of processing shown in FIG. 12 by executing programs stored in the ROM 103 by using the RAM 102 as a work memory. All the processing shown below does not need to be performed by the CPU 101 and it may also be possible to make up the image processing apparatus 100 so that part or all of the processing is performed by one or a plurality of processing circuits other than the CPU 101.

At step S1201, a camera parameter acquisition unit 1101 acquires camera parameters of a camera that has captured a target image from the external storage device 108 via the input interface 105, or from the secondary storage device 104. Further, the camera parameter acquisition unit 1101 determines the viewpoint of the camera that has captured the target image to be the viewpoint of interest. The camera parameters that are acquired at this step are the same as the camera parameters explained in the first embodiment. The camera parameter acquisition unit 1101 outputs the camera parameters to an image conversion unit 1103.

At step S1202, a foreground image acquisition unit 1102 acquires a plurality of foreground images at a plurality of different viewpoints from the external storage device 108 via the input interface 105, or from the secondary storage device 104. The foreground image that is acquired at this step is an image in which a foreground object is extracted and it is assumed that a shadow area is included in the extracted area. In the present embodiment, this foreground image is created based on the captured image and the background image captured in advance. In the following, the method of creating a foreground image is explained specifically. The captured image that is used here is an image obtained by capturing the foreground object and the background in the target image in an environment substantially the same as the environment at the time of capturing the target image. Further, the background image is an image obtained by capturing the background in the target image in an environment substantially the same as the environment at the time of capturing the target image. In the present embodiment, a binary image for each viewpoint is created by comparing, for each viewpoint, the pixel value of the captured image and the pixel value of the background image for each pixel and by setting the pixel value of the pixel at the coordinates where these pixel values are the same to 0 and by setting the pixel value of the other pixels to 1. This binary image is a foreground image. The method of creating a foreground image is not limited to this and the foreground image that is created is not limited to a binary image and may be a multivalued image. Further, the foreground image acquisition unit 1102 acquires the camera parameters corresponding to each foreground image along with the foreground image. Furthermore, the foreground image acquisition unit 1102 stores each foreground image in association with the viewpoint number of the camera in order to distinguish a foreground image from another in the plurality of foreground images. The foreground image acquisition unit 1102 outputs the foreground images and the camera parameters to the image conversion unit 1103.

At step S1203, the image conversion unit 1103 converts the foreground image obtained from the foreground image acquisition unit 1102 into an image in the case where the foreground image is viewed from the viewpoint of interest by using the camera parameters obtained from the camera parameter acquisition unit 1101 and the foreground image acquisition unit 1102. The conversion at this step is the same as that at step S303 of the first embodiment and the image in the case where the foreground image is viewed from the viewpoint of interest is obtained by performing projection conversion for the foreground image with the ground surface as a base for each viewpoint. The foreground image (data) obtained by the image conversion at this step is called a converted foreground image (data). The image conversion unit 1103 outputs the converted foreground image to a coincidence degree calculation unit 1104.

At step S1204, the image conversion unit 1103 determines the image corresponding to the viewpoint closest to the camera viewpoint (viewpoint of interest) from which the target image is captured to be a base foreground image among the foreground images acquired from the foreground image acquisition unit 1102. Specifically, the distance between the coordinates of the viewpoint of interest and the coordinates of the viewpoint corresponding to the foreground image is calculated for each viewpoint. Then, the foreground image (data) corresponding to the viewpoint (base viewpoint) whose calculated distance is the shortest is taken to be the base foreground image (data). The image conversion unit 1103 outputs the viewpoint number corresponding to the base foreground image to a correction unit 1105. In the present embodiment, the viewpoint number corresponding to the base foreground image is called a base viewpoint number. It may also be possible for the viewpoint of interest and the viewpoint of the base foreground image to coincide perfectly with each other.

At step S1205, the coincidence degree calculation unit 1104 determines a pixel of interest in the converted foreground image, which is the target of the determination of the degree of coincidence of the pixel value in a plurality of converted foreground images. In the present embodiment, first, the top-left pixel of the converted foreground image is selected as the pixel of interest and after this, unprocessed pixels are selected sequentially as the pixel of interest. As long as the determination of whether the pixels coincide in the plurality of converted foreground images is performed for all the pixels of the converted foreground image, the pixel of interest may be determined in any order.

At step S1206, the coincidence degree calculation unit 1104 calculates the degree of coincidence in the pixel of interest between the converted foreground image corresponding to the base viewpoint number and another converted foreground image by using the plurality of converted foreground images acquired from the image conversion unit 1103. In the following, the method of calculating the degree of coincidence is explained specifically.

First, the coincidence degree calculation unit 1104 acquires a pixel value $F_1$ ($u_2$, $v_2$) of the converted foreground image at the coordinates ($u_2$, $v_2$) of the determined pixel of interest. Here, 1 represents a subscript to distinguish a converted foreground image from another in a plurality of converted foreground images and the coincidence degree calculation unit 1104 acquires pixel values in the number corresponding to the number of converted foreground images. Next, the coincidence degree calculation unit 1104 calculates an average value of all the acquired pixel values. In the present embodiment, this average value is used as the degree of coincidence. The degree of coincidence is not limited to this and it may also be possible to use a value that reflects the statistical nature of a plurality of pixel values as the degree of coincidence.

At step S1207, the coincidence degree calculation unit 1104 determines whether the processing at step S1205 and step S1206 has been performed for all the pixels of the converted foreground image. In the case where the results of the determination at step S1207 are affirmative, the coincidence degree calculation unit 1104 outputs the calculated degrees of coincidence of all the pixels to the correction unit 1105 and the processing advances to step S1208. On the other hand, in the case where the results of the determination at step S1207 are negative, the processing returns to step S1205.

At step S1208, the correction unit 1105 determines a pixel of interest in the base foreground image (converted foreground image corresponding to the base viewpoint number). In the present embodiment, first, the top-left pixel of the base foreground image is selected as the pixel of interest and unprocessed pixels are sequentially selected as the pixel of interest. As long as the updating (step S1209) of the pixel value based on the degree of coincidence is performed for all the pixels of the base foreground image, the pixel of interest may be determined in any order.

At step S1209, the correction unit 1105 detects a pixel having a strong possibility of being the pixel of the shadow area in the base foreground image based on the degree of coincidence acquired from the coincidence degree calculation unit 1104. Then, the correction unit 1105 removes the shadow area from the incomplete foreground image by changing the pixel value of the detected pixel to 0. In the present embodiment, in the case where the calculated degree of coincidence is higher than or equal to a threshold value determined in advance, the degree of coincidence between the pixels of interest at all the viewpoints is high, and therefore, it is determined that the possibility that the pixel of interest is the pixel of the shadow area not having an altitude is high. Then, the pixel value of the pixel of interest in the base foreground image is changed to 0. On the other hand, in the case where the calculated degree of coincidence is lower than the threshold value, the degree of coincidence between the pixels of interest at all the viewpoints is low, and therefore, it is determined that the possibility that the pixel of interest is the pixel of the foreground object having an altitude is high. In this case, the pixel value of the pixel of interest in the base foreground image is not changed. In the present embodiment, as the threshold value, 0.8 is used, but the value of the threshold value is not limited to this.

At step S1210, the correction unit 1105 determines whether the processing at step S1208 and step S1209 has been performed for all the pixels of the base foreground image. In the case where the results of the determination at step S1210 are affirmative, the correction unit 1105 outputs the base foreground image for which the correction has been completed to the secondary storage unit 104, the external storage device 108, and the display device 109 and the series of processing is completed. On the other hand, in the case where the results of the determination at step S1210 are negative, the processing returns to S1208. The above is the processing to extract a foreground area that is performed by the image processing apparatus 100 in the present embodiment.

<About Effects of the Present Embodiment>

Figure 13:
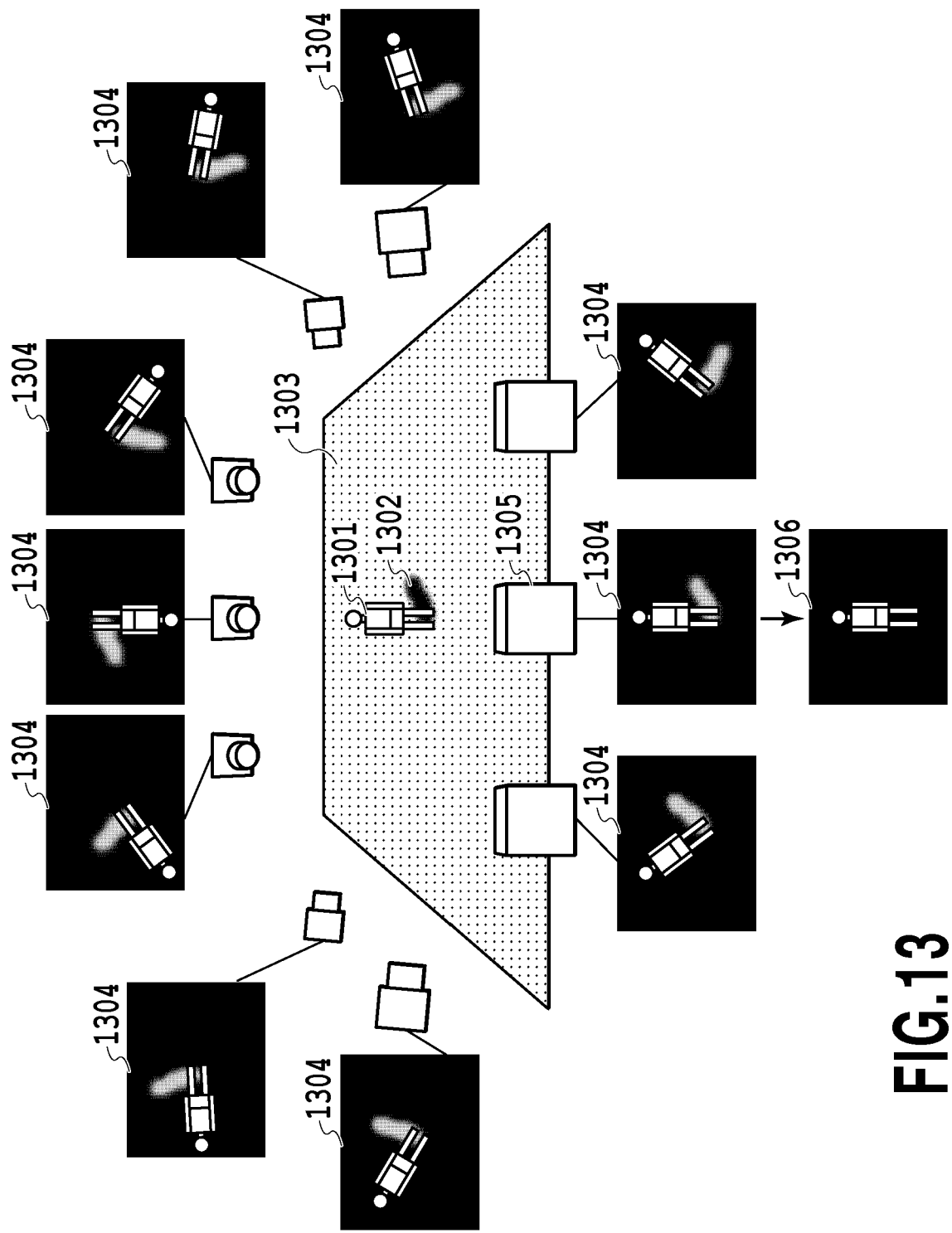
FIG. 13 is a diagram explaining effects of the third embodiment.

In the following, effects of the present embodiment are explained by using FIG. 13. Reference symbol 1301 indicates a foreground object whose own shadow 1302 exists on a ground surface 1303. Images 1304 are foreground images at a plurality of different viewpoints, in which the area of the foreground object 1301 and the shadow 1302 accompanying this is extracted as a foreground area. In the present embodiment, a pixel of the shadow area not having an altitude from the ground surface is detected based on the degree of coincidence between the pixels of interest in a plurality of converted foreground images obtained by converting the images 1304 into images in the case where the images 1304 are viewed from a viewpoint of interest 1305. Then, by correcting the detected pixel, a foreground image 1306 is created. In the foreground image 1306, the area of the shadow 1302 accompanying the foreground object 1301 having an altitude is removed and only the area of the foreground object 1301 is extracted. As described above, according to the present embodiment, even in the case where there exists a shadow accompanying a foreground object having an altitude, it is possible to extract only the foreground object with high accuracy without extracting the shadow area.

In the present embodiment, as the incomplete foreground image, the foreground image created based on the captured image and the background image captured in advance is used, but it may also be possible to use the foreground image created by the first embodiment or the second embodiment. On this occasion, it is possible to extract a foreground object with high accuracy compared to the case where the first embodiment, the second embodiment, and the third embodiment are performed separately.

Other Embodiments

The embodiments of the present invention are not limited to the above-described first to third embodiments and there can be a variety of embodiments. For example, in the above-described first to third embodiments, the case is explained where the size of the reference image and the size of the target image are the same, but these sizes do not need to be the same. On this occasion, the background image is converted into an image in the case where the background image is viewed from the base viewpoint, which is the viewpoint in the case where the ground surface is viewed from above. Then, by correcting the background image by using the converted image and by converting the corrected background image into an image in the case where the corrected background image is viewed from the pixel of interest, a reference image corresponding to the target image is created.

Further, in the above-described first to third embodiments, at the time of calculation of the degree of coincidence and extraction of a foreground, a pixel value in the RGB space is used, but the information that is used is not limited to this. For example, it may also be possible to calculate the degree of coincidence and to extract a foreground by using a pixel value in a different color space, such as HSV and Lab.

Furthermore, in the above-described first to third embodiments, at the time of performing projection conversion of an image, only one plane of the ground surface is taken to be a base, but it may also be possible to use a plurality of planes parallel to the ground surface as a base. For example, it may also be possible to calculate the degree of coincidence by setting a plurality of planes by equally dividing the space between an altitude of 0 cm and an altitude of 1 cm from the ground surface and by using all converted images obtained by projection conversion with each of the set planes as a base. By doing so, the robust properties for an error in the camera parameters improve.

Fourth Embodiment

Next, a fourth embodiment is explained by focusing attention on differences from the first and third embodiments. In the present embodiment, by using foreground images at a plurality of different viewpoints, an area having a strong possibility of being a shadow area is detected, and based on a difference in color between the background image and the captured image in the detected area, a foreground object not including a shadow is extracted. The area of the foreground object is called a foreground area.

<About Outline of the Present Embodiment>

Figure 16:
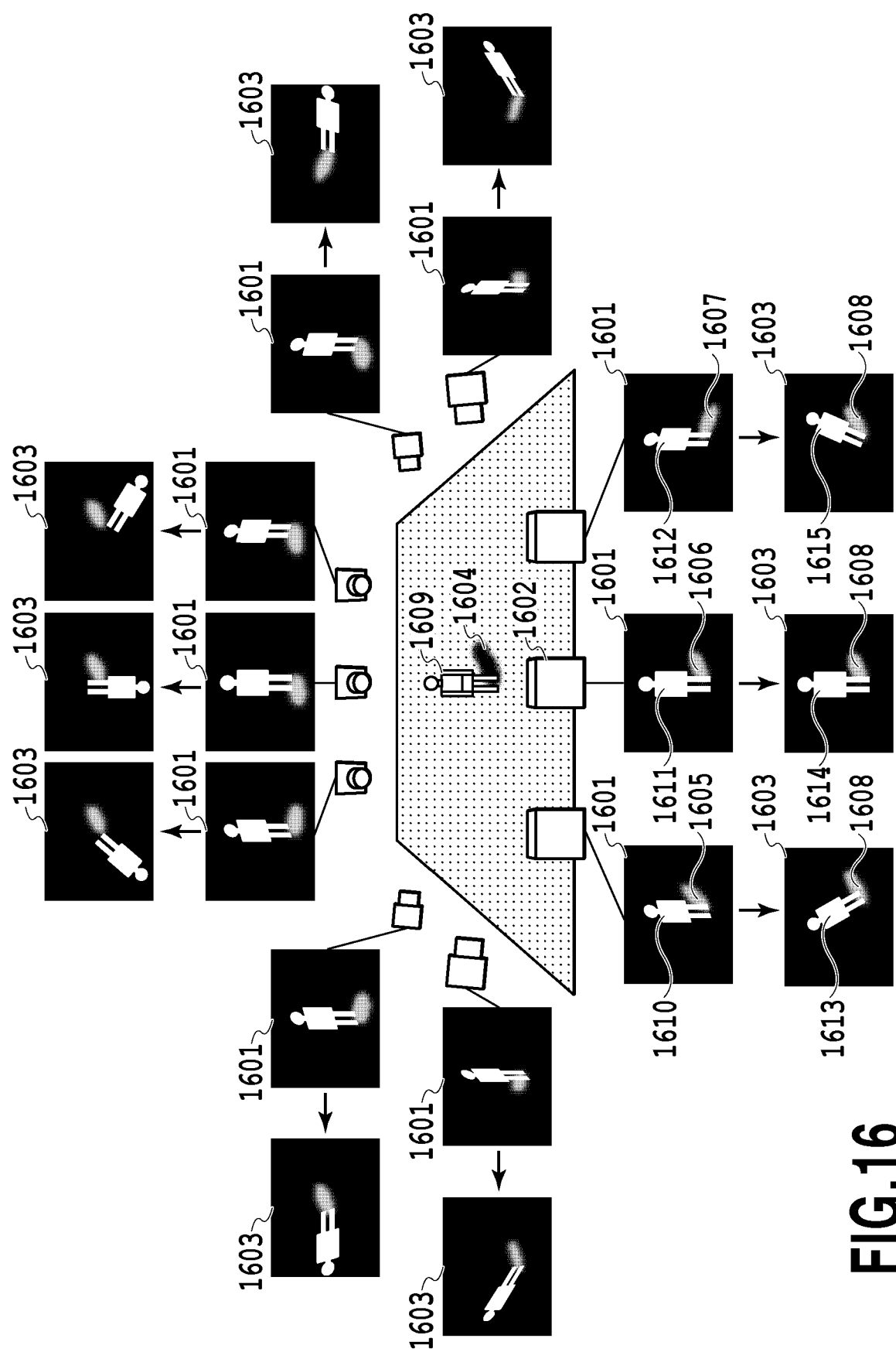
FIG. 16 is a diagram explaining an outline of the processing to extract a foreground area in the fourth embodiment.

In the following, an outline of processing to extract a foreground area in the present embodiment is explained by using FIG. 16. In the present embodiment, first, foreground images 1601 at a plurality of different viewpoints are acquired. The foreground image that is acquired here is an image in which the area of a foreground object 1609 and a shadow 1604 accompanying this is extracted as a foreground area. It is assumed that in the plurality of foreground images 1601 to be acquired, an image is included whose viewpoint is the same as a viewpoint of interest 1602 from which an image is captured, which is a target of extraction of only the area of the foreground object 1609 not including the area of the shadow 1604 as a foreground area. Hereinafter, the image from which only the area of the foreground object 1609 not including the area of the shadow 1604 is extracted as a foreground area is called a target image and the viewpoint from which the target image is captured is called a viewpoint of interest.

Next, by converting, for each viewpoint, the acquired foreground image 1601 into an image in the case where the foreground image 1601 is viewed from the viewpoint of interest 1602 with the ground surface as a base, a foreground image 1603 at the viewpoint of interest is created. The number of foreground images 1603 created here is the same as the number of foreground images 1601. Hereinafter, the foreground image 1603 obtained by converting the foreground image 1601 is called the converted foreground image 1603.

As also described in the first to third embodiments, almost all of the foreground objects, such as a person and gear, have an altitude from the ground surface. In contrast to this, a shadow that accompanies the foreground object normally exists on the ground surface and does not have an altitude from the ground surface. Because of this, in the present embodiment, by using the converted foreground image 1603, a foreground object not having an altitude form the ground surface is detected and it is regarded that the foreground object corresponding to the detected area has a strong possibility of being a shadow. Specifically, whether the pixel is the foreground area (hereinafter, common foreground area) in common in the plurality of converted foreground images 1603 is determined for each pixel and the pixel determined to be the common foreground area is detected as a candidate of the shadow area. As described above, the converted foreground image 1603 is obtained by converting the foreground image 1601 into an image in the case where the foreground image 1601 is viewed from the viewpoint of interest 1602 with the ground surface as a base plane. Because of this, the coordinates of shadow areas 1605 to 1607 in the foreground images 1601, which correspond to the shadow 1604 existing on the ground surface and not having an altitude, are converted into the coordinates of a common foreground area 1608 existing at the same position in common in all the converted foreground images 1603. On the other hand, the coordinates of areas 1610 to 1612 in the foreground images 1601, which correspond to the object 1609 having an altitude, are converted into the coordinates of areas 1613 to 1615 whose positions differ depending on the viewpoint. Because of this, in the case where there is a common foreground area in the plurality of converted foreground images 1603, the pixel of the common foreground area is detected by regarding it as a candidate of the pixel of the shadow area and on the other hand, the pixel of the foreground area, which is not the common foreground area, is regarded as the pixel of the foreground object having an altitude.

Next, the candidates of the detected pixel of the shadow area are compared between the background image and the captured image at the viewpoint of interest 1602 and the pixel whose difference in color is small is determined to be the pixel of the shadow area. In the foreground images 1601 at the viewpoint of interest 1602, in which the area of the object 1609 and the shadow 1604 accompanying this is extracted as a foreground area, by finally changing the pixel value of the pixel determined to be the pixel of the shadow area, a foreground area not including the shadow area is extracted. In the case where a shadow accompanying an object, such as a person and gear, is produced, in the captured image, the area in which a shadow exists in the background and on the ground surface appears as a dark area compared to the case where a shadow does not exist. On the other hand, in the captured image, the image of an object, such as a person and gear, is normally drawn in a color different from the color of the background and the ground surface that appear in the case where the object does not exist. Because of this, in the area having a strong possibility of being a shadow, it is possible to regard the pixel whose difference in color between the background image and the captured image is small as the pixel of the shadow area.

The above is the outline of the processing that is performed in the present embodiment. The target image that is used is not limited to the above-described example and it may also be possible to use various kinds of image data, such as data whose image has been captured by a monitoring camera.

<About Hardware Configuration of Image Processing Apparatus>

The hardware configuration of the image processing apparatus of the present embodiment is similar to that of the first embodiment (see FIG. 1).

<About Processing to Extract Foreground Area>

Figure 14:
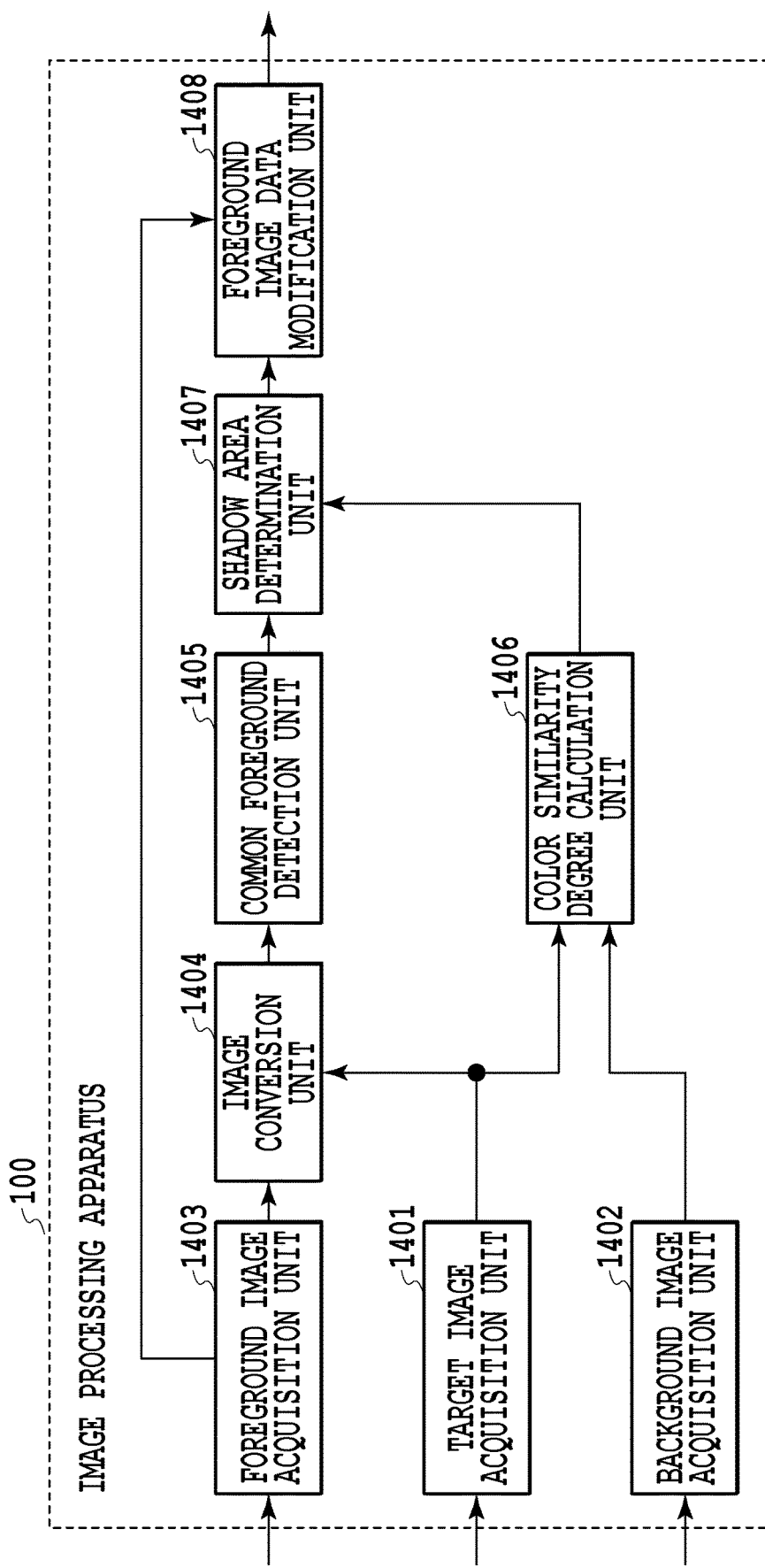
FIG. 14 is a block diagram showing a function configuration of an image processing apparatus in a fourth embodiment.
Figure 15:
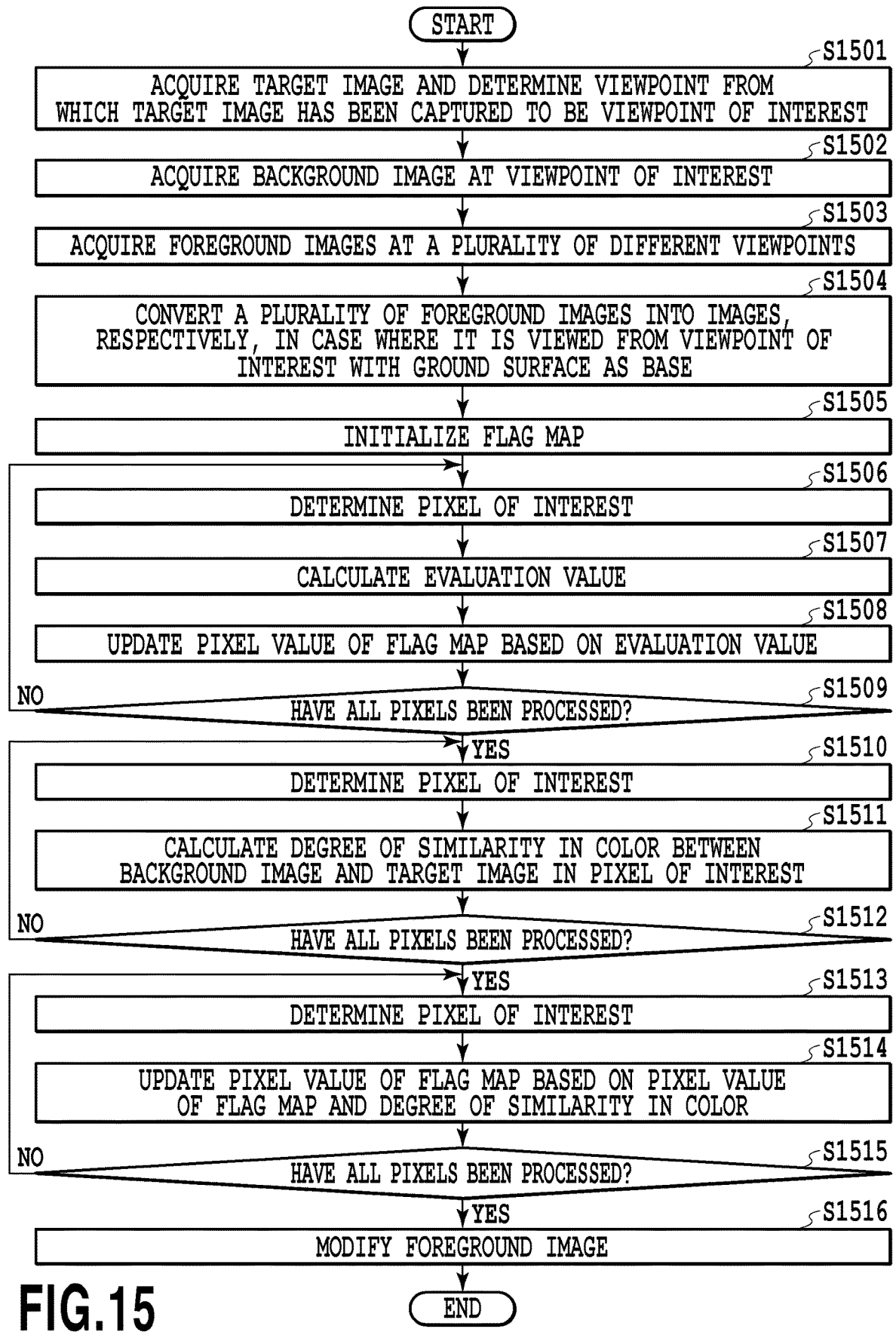
FIG. 15 is a flowchart showing a flow of processing to extract a foreground area in the fourth embodiment.

In the following, processing to extract a foreground area that is performed by the image processing apparatus 100 in the present embodiment is explained by using FIG. 14 and FIG. 15. FIG. 14 is a block diagram showing a function configuration of the image processing apparatus 100 and FIG. 15 is a flowchart showing a flow of the processing to extract a foreground area. The CPU 101 of the image processing apparatus 100 functions as each component shown in FIG. 14 and performs a series of processing shown in FIG. 15 by executing programs stored in the ROM 103 by using the RAM 102 as a work memory. All the processing shown below does not need to be performed by the CPU 101 and it may also be possible to make up the image processing apparatus 100 so that part or all of the processing is performed by one or a plurality of processing circuits other than the CPU 101.

In the following, the flow of processing that is performed by each component is explained. At step S1501, a target image acquisition unit 1401 acquires a target image from the external storage device 108 via the input interface 105, or from the secondary storage unit 104. As described above, the target image is an image that is a target of extraction of a foreground object. Further, the target image acquisition unit 1401 determines the viewpoint of a camera that has captured the target image to be the viewpoint of interest. Furthermore, the target image acquisition unit 1401 acquires the parameters (hereinafter, camera parameters) of the camera that has captured the target image, along with the target image. Here, the camera parameters are parameters that enable a calculation to project a point in the three-dimensional space onto an image captured by the camera and include external parameters representing the position and the attitude of the camera and internal parameters representing the focal length and the optical center. It may also be possible to use measured values and design values stored in advance on a memory as camera parameters. The target image acquisition unit 1401 outputs the target image to a color similarity degree calculation unit 1406 and the camera parameters of the target image to an image conversion unit 1404. Here, the case is explained where the number of target images is one, but it is also possible to apply the present embodiment to the case where the number of target images is two or more.

At step S1502, a background image acquisition unit 1402 acquires the background image at the viewpoint of interest from the external storage device 108 via the input interface 105, or from the secondary storage unit 104. The background image in the present embodiment is an image in which only the background in the target image is photographed. In the present embodiment, the background image is acquired by performing image capturing in advance in the state where the foreground object does not exist and only the background exists. In detail, image capturing is performed by using a camera having the same camera parameters as the camera parameters of the camera that has captured the target image in an environment substantially the same environment (weather, time zone, and so on) at the time of capturing the target image. The method of acquiring a background image is not limited to this method. For example, it may also be possible to create a background image by performing filter processing using a mean value filter or an average value filter for a plurality of images corresponding to a plurality of different times, which is obtained by continuously capturing the images of a scene from the same viewpoint along a time series. Alternatively, it may also be possible to create a background image by performing clustering processing for the plurality of images. The background image acquisition unit 1402 outputs the background image to the color similarity degree calculation unit 1406.

At step S1503, a foreground image acquisition unit 1403 acquires a plurality of foreground images at a plurality of different viewpoints as reference images from the external storage device 108 via the input interface 105, or from the secondary storage unit 104. It is assumed that the foreground image acquired at this step is an image (e.g., the foreground image 1601 in FIG. 16) in which the foreground object is extracted, and in the extracted foreground area, a shadow area is included. In the present embodiment, this foreground image is created based on the captured image and the background image. In the following, the creation method of a foreground image is explained specifically. The captured image that is used here is an image obtained by capturing the image of the foreground object and the background in the target image in an environment substantially the same as the environment at the time of capturing the target image. Further, the background image is an image obtained by capturing the image of the background in the target image in an environment substantially the same as the environment at the time of capturing the target image. In the present embodiment, for each viewpoint, the pixel value of the captured image and the pixel value of the background image are compared for each pixel and by setting the pixel value of the pixel at the coordinates at which these pixel values are the same to 0 and by setting the pixel value of the other pixels to 1, a binary image for each viewpoint is created. This binary image is the foreground image. It is assumed that in a plurality of foreground images thus created, an image whose viewpoint is the same as the viewpoint of interest is included. The method of creating a foreground image is not limited to this method and the foreground image that is created may be a multivalued image, not limited to a binary image. Further, the foreground image acquisition unit 1403 acquires the camera parameters corresponding to each foreground image, along with the foreground image. Furthermore, the foreground image acquisition unit 1403 stores each foreground image in association with the viewpoint number of the camera in order to distinguish a foreground image from another in the plurality of foreground images. The foreground image acquisition unit 1403 outputs the foreground image and the camera parameters to the image conversion unit 1404 and outputs only the foreground image to a foreground image data modification unit 1408.

At step S1504, the image conversion unit 1404 converts the plurality of foreground images into images in the case where the foreground images are viewed from the viewpoint of interest, respectively, by using the camera parameters acquired from the foreground image acquisition unit 1403. Specifically, by performing projection conversion for each foreground image with the ground surface as a base, an image in the case where the foreground image is viewed from the viewpoint of interest is obtained. The image (data) obtained by the image conversion at this step is called a converted foreground image (data). Here, the method of image conversion at this step is as described above by using FIG. 5.

At step S1504, projection conversion taking the camera with the viewpoint corresponding to the foreground image acquired from the foreground image acquisition unit 1403 to be the camera 502 in FIG. 5 and the camera with the viewpoint of interest determined by the target image acquisition unit 1401 to be the camera 505 is performed for each foreground image. Because of this, the number of converted foreground images acquired at this step is the same as the number of foreground images acquired by the foreground image acquisition unit 1403. Further, each of the converted foreground images is stored in association with the viewpoint number of each foreground image acquired by the foreground image acquisition unit 1403. The image conversion unit 1404 outputs the converted foreground image to a common foreground detection unit 1405.

At step S1505, the common foreground detection unit 1405 initializes the flag map, i.e., sets the pixel values of all the pixels of the flag map to 0. The flag map that is initialized at this step is used to detect a shadow area in the foreground image of the viewpoint of interest, which is acquired by the foreground image acquisition unit 1403. In this flag map, 1 is substituted for the pixel value corresponding to the pixel determined to be the pixel of the shadow area (or pixel having a strong possibility of being the pixel of the shadow area) and 0 is substituted for the pixel value corresponding to the pixel determined to be not the pixel of the shadow area. By the initialization at this step, the entire area of the foreground image of the viewpoint of interest is determined to be not the shadow area.

At step S1506, the common foreground detection unit 1405 determines a pixel of interest in the converted foreground image, which is the target for which determination of whether the pixel of interest is the pixel of the common foreground area is performed. In the present embodiment, first, the top-left pixel of the converted foreground image is selected as the pixel of interest and after this, unprocessed pixels are sequentially selected as the pixel of interest. As long as the determination of whether the pixel of interest is the pixel of the common foreground area is performed for all the pixels of the converted foreground image, the pixel of interest may be determined in any order.

At step S1507, the common foreground detection unit 1405 calculates an evaluation value that is used at the time of determining whether the pixel of interest is the pixel of the common foreground area based on the plurality of converted foreground images acquired from the image conversion unit 1404. In the following, the calculation method of an evaluation value is explained specifically.

First, the common foreground detection unit 1405 acquires a pixel value $F_i$ ($u_2$, $v_2$) of the converted foreground image at the coordinates ($u_2$, $v_2$) of the pixel of interest. Here, i represents a subscript to distinguish a converted foreground image from another in the plurality of converted foreground images and the common foreground detection unit 1405 acquires pixel values in the number corresponding to the number of converted foreground images. Next, the common foreground detection unit 1405 calculates an average value of all the acquired pixel values. In the present embodiment, this average value is used as an evaluation value at the time of determining whether the pixel of interest is the pixel of the common foreground image. The calculation method of an evaluation value is not limited to this, and it may also be possible to use an arbitrary value that represents the statistical nature of a plurality of pixel values, such as a mean value, as an evaluation value.

At step S1508, the common foreground detection unit 1405 determines whether or not the pixel of interest is the pixel of the common foreground area based on the evaluation value and updates the pixel value of the flag map in accordance with the results of the determination. Specifically, as expressed by expression (5), by regarding the pixel whose evaluation value is larger than or equal to a threshold value as the pixel of the common foreground area, the pixel value of the flag map corresponding to the pixel is set to 1. Conversely, by regarding the pixel whose evaluation value is smaller than the threshold value as a pixel that is not the pixel of the common foreground area and the pixel value of the flag map corresponding to the pixel is set to 0.

$$M_f(x, y) = \begin{cases} 1 & \text{if } V(x, y) \geq Th \\ 0 & \text{if } V(x, y) < Th \end{cases} \quad \text{expression (5)}$$

Here, V (x, y) represents an evaluation value at coordinates (x, y) and Th represents a threshold value. The threshold that is used here is determined based on the maximum pixel value that the pixel of the foreground image can take or the number of converted foreground images (i.e., number of viewpoints). For example, in the case of FIG. 16, as the foreground image, a binary image is used, and therefore, the maximum pixel value is 1, the number of viewpoints is ten, and it may also be possible to use a value of 0.6 as a threshold value, which indicates that the pixel of interest is the pixel of the foreground image at the majority of the viewpoints.

As described above, in the case where there is a common foreground area in a plurality of converted foreground images, it is possible to regard the pixel of the common foreground area as a candidate of the pixel of the shadow area. Because of this, by updating the pixel value of the flag map, which corresponds to the pixel whose evaluation value is determined to be larger than or equal to the threshold value, to 1 at this step, it is indicated that the possibility that the pixel is the pixel of the shadow area is strong.

At step S1509, the common foreground detection unit 1405 determines whether the processing at step S1506 to step S1508 has been performed for all the pixels of the converted foreground image. In the case where the results of the determination at step S1509 are affirmative, the common foreground detection unit 1405 outputs the updated flag map to a shadow area determination unit 1407 and the processing advances to step S1510. On the other hand, in the case where the results of the determination are negative, the processing returns to step S1506.

At step S1510, the color similarity degree calculation unit 1406 determines a pixel of interest in the target image, which is the target of the calculation of the degree of similarity in color between the target image acquired from the target image acquisition unit 1401 and the background image acquired from the background image acquisition unit 1402. In the present embodiment, first, the top-left pixel of the target image is selected as the pixel of interest and after this, unprocessed pixels are sequentially selected as the pixel of interest. As long as the degree of similarity in color is calculated for all the pixels of the target image, the pixel of interest may be determined in any order.

At step S1511, the color similarity degree calculation unit 1406 calculates the degree of similarity in color in the pixel of interest between the target image acquired from the target image acquisition unit 1401 and the background image acquired from the background image acquisition unit 1402. In the present embodiment, as expressed in expression (6), the square mean error of the pixel value is used as the degree of similarity in color $$C(x, y) = \frac{1}{3} \sum_{k=1}^{3} (I^k(x, y) - I_b^k(x, y))^2 \qquad \text{expression (6)}$$

Here, I (x, y) and Ib (x, y) represent the pixel value of the target image and the pixel value of the background image, respectively, at the coordinates (x, y) and k represents a subscript to identify the three channels of RGB. The value of the degree of similarity in color C that is calculated by expression (6) becomes smaller as the color of the pixel of interest in the target image and the color of the pixel at the same coordinates as those of the pixel of interest in the background image become more similar. The degree of similarity in color that is used is not limited to the square mean error and an arbitrary value that indicates the degree of similarity in color between pixels may be used. At the time of calculating the degree of similarity in color in the pixel of interest, it may also be possible to calculate the degree of similarity in color by using the pixel of interest and peripheral pixels thereof.

At step S1512, the color similarity degree calculation unit 1406 determines whether the processing at step S1510 and step S1511 has been performed for all the pixels of the target image. In the case where the results of the determination at step S1512 are affirmative, the color similarity degree calculation unit 1406 outputs the calculated degrees of similarity in color of all the pixels to the shadow area determination unit 1407 and the processing advances to step S1513. On the other hand, in the case where the results of the determination are negative, the processing returns to step 1510.

At step S1513, the shadow area determination unit 1407 determines a pixel of interest in the flag map acquired from the common foreground detection unit 1405, which corresponds to the target pixel for which whether the pixel of interest is the pixel corresponding to the pixel of the shadow area is determined. In the present embodiment, first, the top-left pixel of the flag map is selected as the pixel of interest and after this, unprocessed pixels are sequentially selected as the pixel of interest. As long as the updating (step S1514) of the pixel value based on the pixel value of the flag map and the degree of similarity in color is performed for all the pixels of the flag map, the pixel of interest may be determined in any order.

At step S1514, the shadow area determination unit 1407 determines whether the pixel of interest is the pixel corresponding to the pixel of the shadow area based on the flag map acquired from the common foreground detection unit 1405 and the degree of similarity in color acquired from the color similarity degree calculation unit 1406. Specifically, in the case where two conditions below are satisfied, it is determined that the pixel of interest is the pixel corresponding to the pixel of the shadow area and the pixel value of the pixel of interest in the flag map is set to 1. On the other hand, in the case where the two conditions are not satisfied, it is determined that the pixel of interest is not the pixel corresponding to the pixel of the shadow area and the pixel value of the pixel of interest in the flag map is set to 0.

First condition: the pixel value of the flag map is 1 ($M_F(u_2, v_2)=1$)

Second condition: the degree of similarity in color is lower than or equal to a threshold value ($C(u_2, v_2) \leq Thr$)

As described above, it is possible to regard the pixel whose color difference between the background image and the captured image is small as the pixel of the shadow area in the area having a strong possibility of being a shadow. Because of this, the pixel that satisfies the above-described two conditions, i.e., the pixel whose pixel value of the flag map is 1 and the whose degree of similarity in color is lower than or equal to the threshold value, (i.e., the pixel whose color is similar between the background image and the captured image) is regarded as the pixel of the shadow area.

At step S1515, the shadow area determination unit 1407 determines whether the processing at step S1513 and step S1514 has been performed for all the pixels of the flag map. In the case where the results of the determination at step S1515 are affirmative, the shadow area determination unit 1407 outputs the updated flag map to the foreground image data modification unit 1408 and the processing advances to step S1516. On the other hand, in the case where the results of the determination are negative, the processing returns to step S1513.

At step S1516, the foreground image data modification unit 1408 modifies the foreground image at the viewpoint of interest acquired from the foreground image acquisition unit 1403 based on the flag map acquired from the shadow area determination unit 1407. Specifically, for each pixel of the foreground image at the viewpoint of interest, whether the pixel value is 1 and the pixel value of the pixel at the same coordinates in the flag map is 1 (indicating that the pixel of the foreground image is the pixel of the shadow area) is determined. Then, the pixel value of the pixel of the foreground image at the viewpoint of interest, which satisfies these conditions, is changed to 0. On the other hand, the pixel value of the pixel that does not satisfy these conditions is not changed. By this step, it is possible to modify the foreground image at the viewpoint of interest and to extract the foreground area not including the shadow area. The foreground image data modification unit 1408 outputs the modified foreground image to the secondary storage device 104, the external storage device 108, and the display device 109 and the series of processing is completed. The above is the processing to extract a foreground area that is performed by the image processing apparatus 100 in the present embodiment.

<About Effects of the Present Embodiment>

Figure 17:
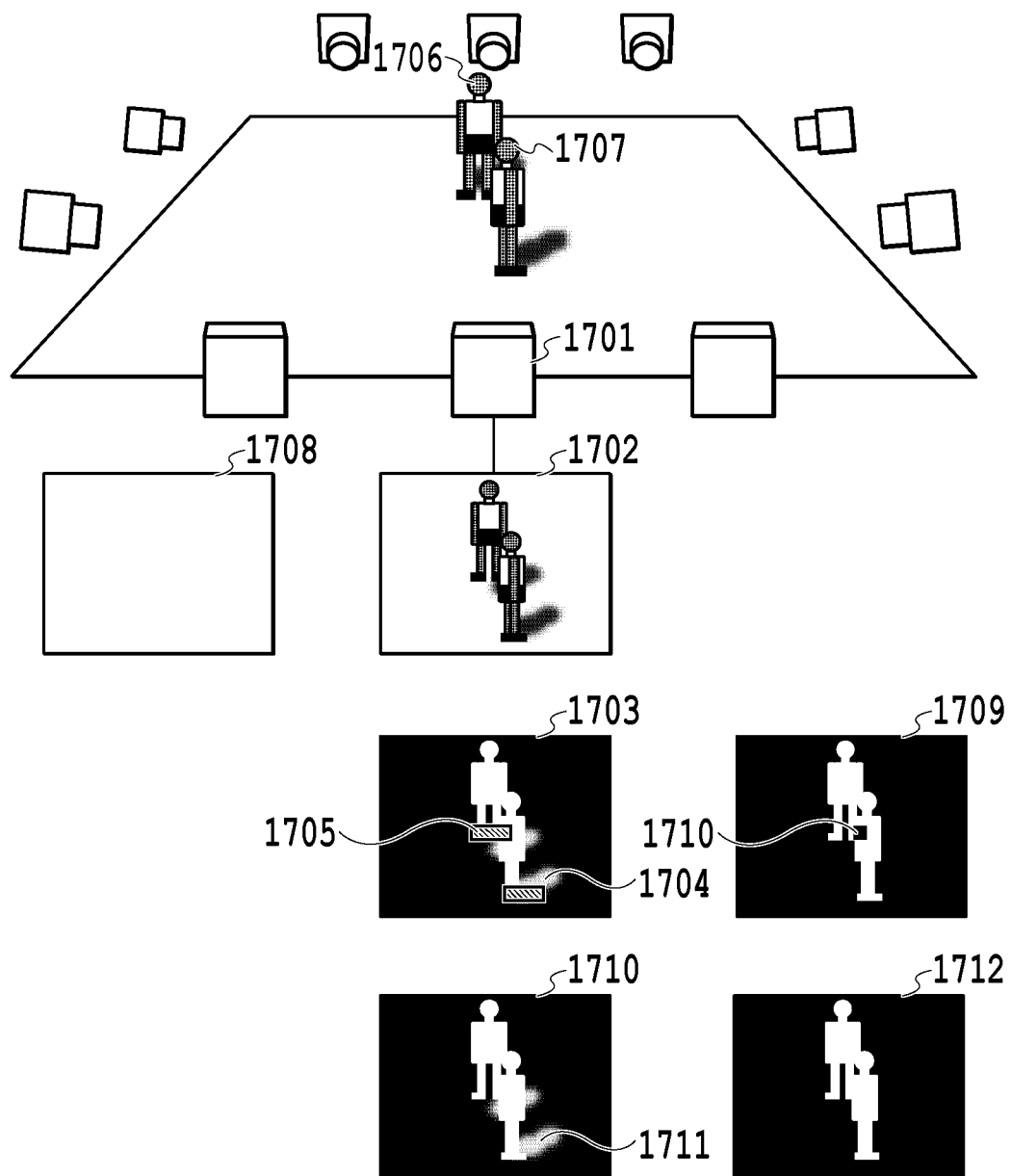
FIG. 17 is a diagram explaining effects of the fourth embodiment.

In the following, effects of the present embodiment are explained by using FIG. 17. In FIG. 17, an image 1702 is a captured image that is captured from a viewpoint of interest 1701 and an image 1703 is a foreground image at the viewpoint of interest 1701 in which the area of foreground objects 1706 and 1707 and shadows accompanying them is extracted as a foreground area. An area 1704 and an area 1705 in the foreground image 1703 are areas corresponding to shapes that exist near the ground surface among three-dimensional shapes restored by using foreground images at a plurality of viewpoints and are regarded as having a strong possibility of being the shadow area. Here, in the case where the size of the voxel used for restoration of the three-dimensional shape is large, in the area 1705 having a strong possibility of being the shadow area of the foreground object 1706, part of the area of the foreground object 1707 is included. In the area 1705 such as this, in the case where the foreground image 1703 is modified by regarding the pixel whose difference in color between the captured image 1702 and a background image 1708 corresponding thereto as the pixel of the shadow area, a foreground image 1709 is obtained. In the foreground image 1709, the area of the foreground objects 1706 and 1707 is extracted without extracting the shadow area due to the shadows that accompany the foreground objects 1706 and 1707. However, in the foreground image 1709, part of the area of the foreground object 1707, i.e., the area that is included in the area having a strong possibility of being the shadow area and in which the color of the foreground object 1707 and the color of the background are similar is not extracted as the foreground area.

In contrast to this, in the present embodiment, by using foreground images (including an image 1710 at the viewpoint of interest 1701) at a plurality of different viewpoints, a common foreground area in a plurality of converted foreground images is detected. Then, by detecting a shadow area 1711 based on the common foreground area and changing the pixel value of the pixel of the shadow area 1711, a foreground image 1712 is created. A comparison between the foreground image 1709 and the foreground image 1712 indicates that the area of the foreground objects 1706 and 1707 is extracted with high accuracy in the foreground image 1712. As described above, according to the present embodiment, it is possible to extract a foreground object not including a shadow with high accuracy irrespective of the state of a scene, such as a state where foreground objects cluster together. Further, the present embodiment is the image processing of a two-dimensional image that does not require restoration of a three-dimensional shape, and therefore, it is possible to extract a foreground object not including a shadow with a small amount of calculation.

Fifth Embodiment

In the fourth embodiment, by using foreground images at a plurality of different viewpoints, an area (common foreground area) having a strong possibility of being a shadow area is detected and based on the difference in color between a background image and a captured image in the area, a foreground object not including a shadow is extracted. In contrast to this, in the present embodiment, a foreground object not including a shadow is extracted based on the difference in color between the background image and the captured image and the difference in texture between the background image and the captured image in the area having a strong possibility of being a shadow. The same configuration and processing as those of the fourth embodiment are given the same symbols and explanation thereof is omitted.

<About Outline of the Present Embodiment>

In the following, an outline of processing to extract a foreground area in the present embodiment is explained. In the present embodiment, a degree of similarity in texture between the background image and the captured image at the viewpoint of interest is calculated for each pixel. Specifically, the degree of similarity in texture is calculated by setting an area (hereinafter, block) consisting of a plurality of pixels in the background image and the captured image and calculating the sum of the amount of change in the pixel value between the background and the captured image for the pixels within the block. Following this, by using the degree of similarity in color explained in the fourth embodiment and the degree of similarity in texture calculated in the present embodiment, a pixel similar in color and similar in texture between the background image and the captured image is detected and the detected pixel is determined to be the pixel of the shadow area. Finally, by changing the pixel value of the pixel determined to be the pixel of the shadow area in the foreground image in which the foreground area including the shadow area is extracted, the foreground area not including the shadow area is extracted.

In the fourth embodiment, in the area having a strong possibility of being a shadow, the pixel similar in color between the background image and the captured image is regarded as the pixel of the shadow area. Consequently, in the case where a foreground object similar in color between an input image and the background image is included in the area having a strong possibility of being a shadow, the foreground object is erroneously regarded as a shadow. As a result of this, it is not possible to extract the foreground object erroneously regarded as a shadow, and therefore, the accuracy of extraction of a foreground object not including a shadow is reduced. By taking this problem into consideration, in the fifth embodiment, by using the degree of similarity in texture, in addition to the degree of similarity in color, whether the pixel of interest is the pixel of a shadow area is determined.

In general, a shadowed area keeps the same pattern as that before being shadowed. For example, in the case where a person stands on a lawn, in the area where a person casts a shadow on the lawn, the color changes depending on the presence/absence of a shadow, but the pattern of the lawn is kept. Consequently, in the area having a strong possibility of being a shadow, it is possible to distinguish the pixel of a foreground object, such as a person, whose color is similar between the background and the foreground, from the pixel of a shadow area accompanying the object based on the degree of similarity in texture. In view of this, by using the degree of similarity in texture at the time of determining a shadow area, the accuracy of the determination of a shadow area improves and it is made possible to extract a foreground object not including a shadow with high accuracy. The area in which texture is kept in the case where a shadow is cast is not limited to the above-described example of lawn and it is possible to apply the present embodiment to various kinds of image data.

<About Processing to Extract Foreground Area>

Figure 18:
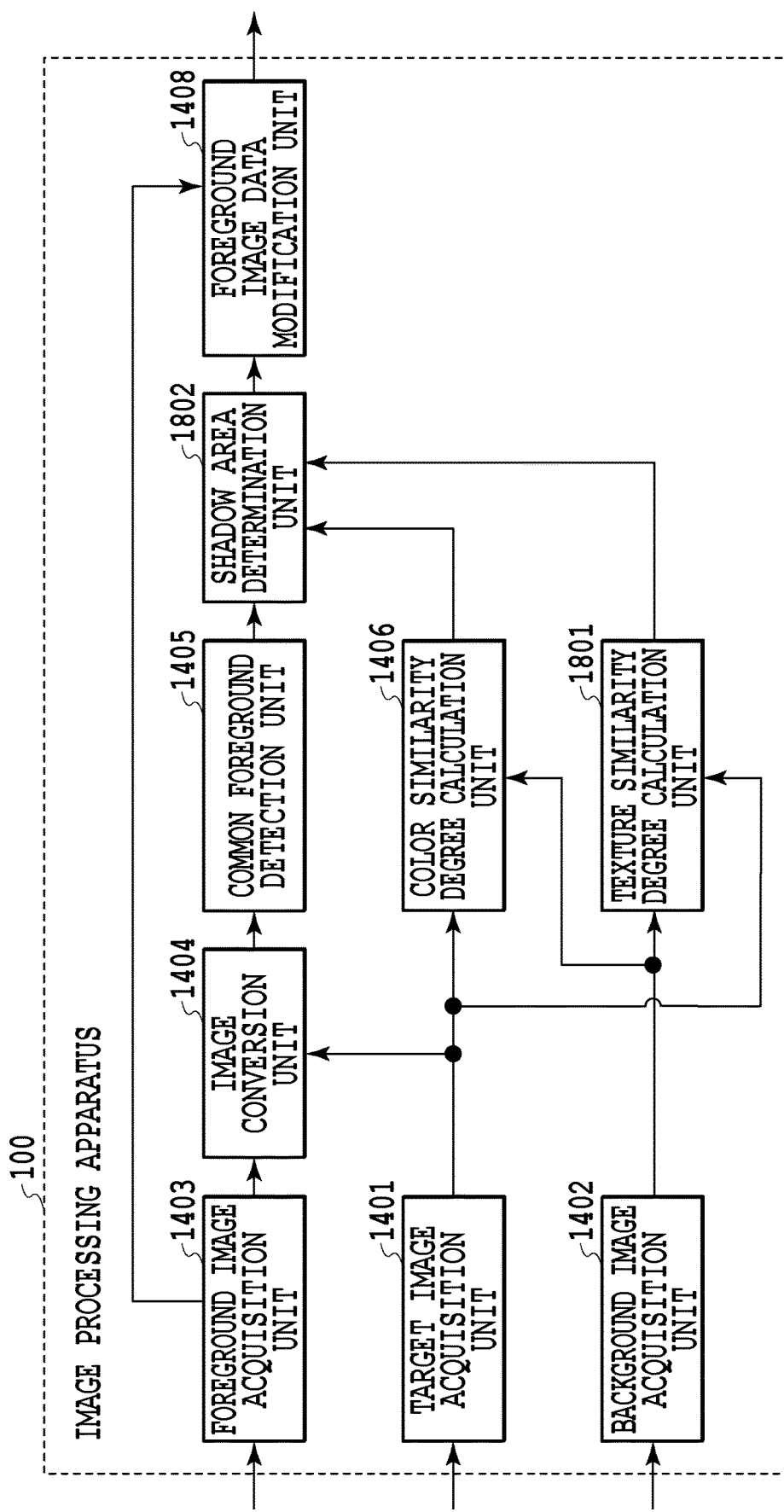
FIG. 18 is a block diagram showing a function configuration of an image processing apparatus in a fifth embodiment.
Figure 19B:
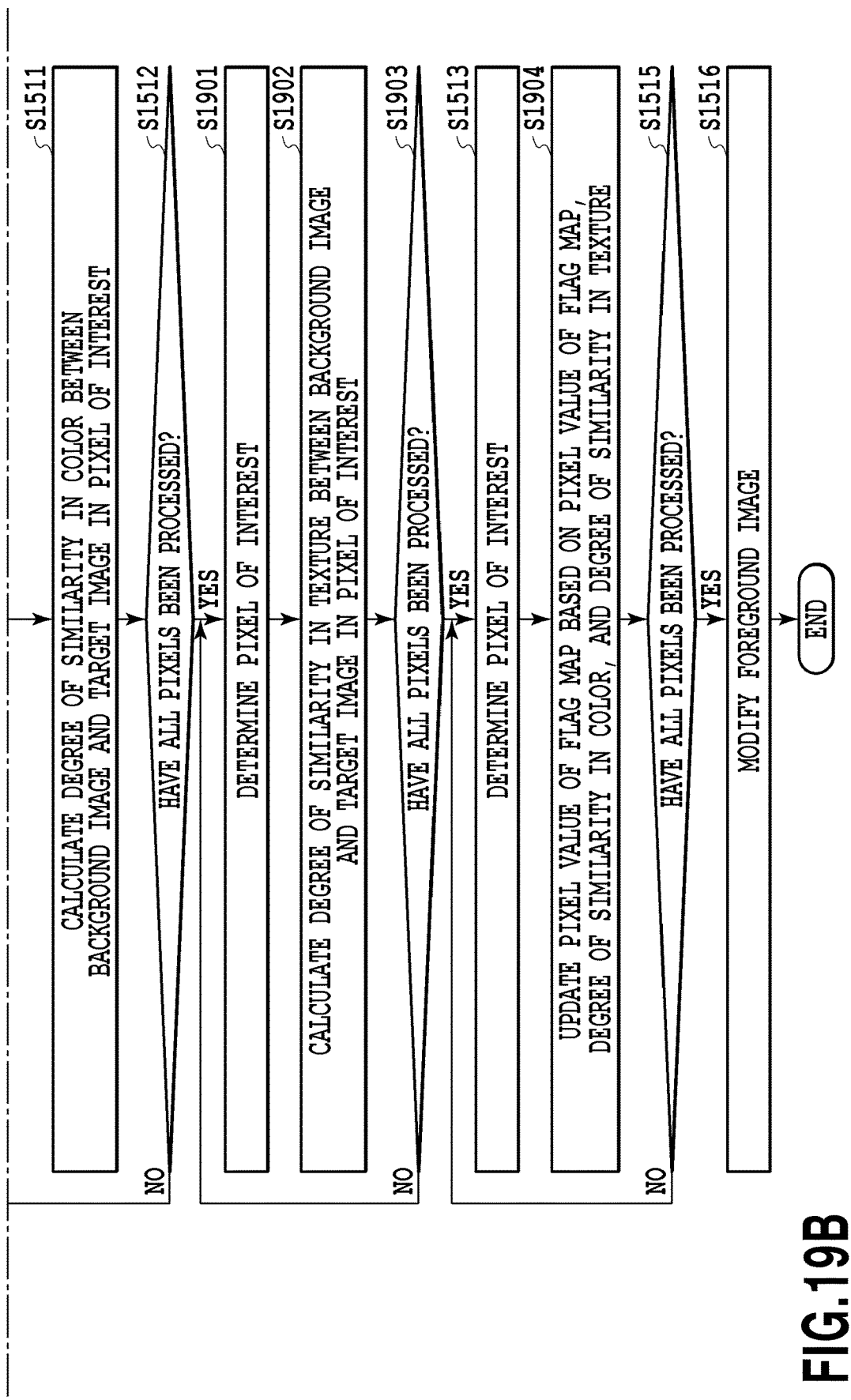
FIG. 19B is a flowchart showing a flow of processing to extract a foreground area in the fifth embodiment.

In the following, processing to extract a foreground area that is performed by the image processing apparatus 100 in the present embodiment is explained by using FIG. 18, FIG. 19A and FIG. 19B. FIG. 18 is a block diagram showing a function configuration of the image processing apparatus 100 in the present embodiment and FIG. 19A and FIG. 19B are flowcharts showing a flow of the processing to extract a foreground area in the present embodiment. The CPU 101 of the image processing apparatus 100 functions as each component shown in FIG. 18 and performs a series of processing shown in FIG. 19A and FIG. 19B by executing programs stored in the ROM 103 by using the RAM 102 as a work memory. All the processing shown below does not need to be performed by the CPU 101 and it may also be possible to make up the image processing apparatus 100 so that part or all of the processing is performed by one or a plurality of processing circuits other than the CPU 101.

At step S1901, a texture similarity degree calculation unit 1801 determines a pixel of interest in a target image. The pixel of interest that is determined at this step is a pixel that is a target for which the degree of similarity in texture is calculated between the target image acquired from the target image acquisition unit 1401 and the background image acquired from the background image acquisition unit 1402. In the present embodiment, first, the top-left pixel of the target image is selected as the pixel of interest and after this, unprocessed pixels are sequentially selected as the pixel of interest. As long as the degree of similarity in texture is calculated for all the pixels of the target image, the pixel of interest may be determined in any order.

At step S1902, the texture similarity degree calculation unit 1801 calculates the degree of similarity in texture in the pixel of interest between the target image acquired from the target image acquisition unit 1401 and the background image acquired from the background image acquisition unit 1402. In the following, the calculation method of the degree of similarity in texture is explained specifically.

First, in the background image, a background pixel that is compared with the pixel of interest of the target image is determined. Specifically, the pixel of the background image, whose coordinates are the same as the coordinates ($u_2$, $v_2$) of the pixel of interest, is taken to be a reference pixel. Further, peripheral pixels of the pixel of interest are determined, which are used at the time of calculating the degree of similarity in texture. In the present embodiment, a block with the pixel of interest as a center is defined and pixels included in the block are determined to be pixels that are used at the time of calculating the degree of similarity in texture. The size of the block is determined in advance in accordance with the image size of the target image. For example, in the case where the image size of the target image is FHD (1920×1080), the size of the block is set to 9×9.

Next, the block with the pixel of interest of the target image as a center is compared with the block with the reference image of the background image as a center, and the degree of similarity in texture is calculated. In the present embodiment, as expressed in expression (7), the square mean error of the pixel value between the blocks, targets of the comparison, is used as the degree of similarity in texture.

$$W(x, y) = \frac{1}{3}\sum_{k=1}^{3}\frac{1}{|B|}\sum_{(x,y)\in B}(I_b^k(x, y) - I(x, y))^2 \quad \text{expression (7)}$$

Here, B represents a set of pixels included in the block with the coordinates (x, y) of the pixel that is used for matching as a center and |B| represents the number of pixels included in the set B. Further, I (x, y) and Ib (x, y) represent the pixel value of the target image and the pixel value of the background image, respectively, at the coordinates (x, y) and k represents a subscript to identify the three channels of RGB. The value of a degree of similarity in texture W that is calculated by expression (7) becomes smaller as the texture becomes more similar between the pixel of interest in the target image and the reference pixel in the background image. The degree of similarity in texture that is used is not limited to the square mean error expressed in expression (7) and an arbitrary value indicating the degree of similarity in texture between pixels may be used. Further, it may also be possible to calculate the degree of similarity in texture by using converted images by creating the converted images in which the contour is extracted by performing filter processing or the like for the target image and the background image. Furthermore, it may also be possible to use a calculated difference as the degree of similarity in texture by calculating the difference in the feature amount of each block between the target image and the background image after calculating the feature amount in each block of the target image and the background image.

At step S1903, the texture similarity degree calculation unit 1801 determines whether the processing at step 1901 and step S1902 has been performed for all the pixels of the target image. In the case where the results of the determination at step 1903 are affirmative, the texture similarity degree calculation unit 1801 outputs the calculated degrees of similarity in texture of all the pixels to a shadow area determination unit 1802 and the processing advances to step S1513. On the other hand, in the case where the results of the determination are negative, the processing returns to step S1901.

At step S1904, the shadow area determination unit 1802 determines whether the pixel of interest is the pixel corresponding to the pixel of the shadow area. This determination is performed based on the flag map acquired from the common foreground detection unit 1405, the degree of similarity in color acquired from the color similarity degree calculation unit 1406, and the degree of similarity in texture acquired from the texture similarity degree calculation unit 1801. Specifically, in the case where three conditions below are satisfied, it is determined that the pixel of interest in the flag map is the pixel corresponding to the pixel of the shadow area and the pixel value of the pixel of interest is set to 1.

First condition: the pixel value of the flag map is 1 ($M_F$ ($u_2$, $v_2$)=1)

Second condition: the degree of similarity in color is lower than or equal to the threshold value (C ($u_2$, $v_2$)≤Thr)

Third condition: the degree of similarity in texture is lower than or equal to a threshold value (W ($u_2$, $v_2$)≤Thr2)

On the other hand in the case where these three conditions are not satisfied, it is determined that the pixel of interest in the flag map is not the pixel corresponding to the pixel of the shadow area, and the pixel value of the pixel of interest is set to 0.

As described above, in the candidates having a strong possibility of being a shadow, the pixel whose difference in color is small and whose difference in texture is small between the background image and the captured image can be regarded as the pixel of the shadow area. Because of this, the pixel that satisfies the above-described three conditions is regarded as the pixel of the shadow area. The pixel that satisfies the above-described three conditions is, in other words, the pixel whose pixel value of the flag map is 1, whose degree of similarity in color is lower than or equal to the threshold value, i.e., the color is similar between the background image and the captured image, and whose degree of similarity in texture is lower than or equal to the threshold value, i.e., the texture is similar between the background image and the captured image. The above is the processing to extract a foreground area that is performed by the image processing apparatus 100 in the present embodiment.

<About Effects of the Present Embodiment>

Figure 20:
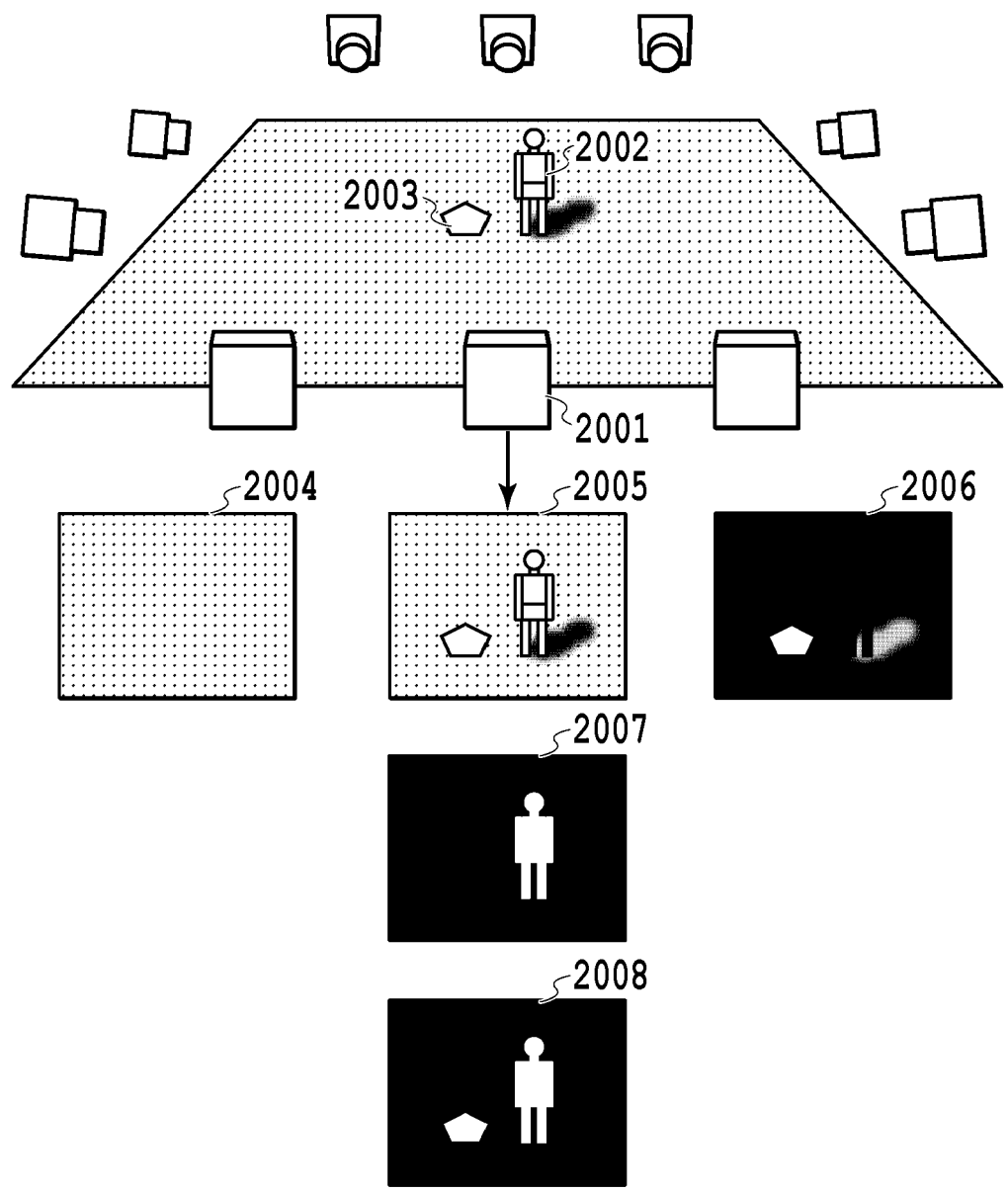
FIG. 20 is a diagram explaining effects of the fifth embodiment.

In the following, effects of the present embodiment are explained by using FIG. 20. In FIG. 20, an image 2004 is a background image captured from a viewpoint of interest 2001 and an image 2005 is a captured image obtained by capturing the images of an object 2002 accompanied by a shadow and an object 2003 that exists on the ground surface from the viewpoint of interest 2001. An image 2006 is an image representing an area having a strong possibility of being a shadow in the image 2005, which is detected by the image processing apparatus 100 of the fourth embodiment or the image processing apparatus 100 of the present embodiment. In the image 2006, the pixel of the area having a strong possibility of being a shadow is represented as a white pixel.

Application of the fourth embodiment to the case in FIG. 20 will create a foreground image 2007 in which the foreground object not including a shadow is extracted by regarding the pixel whose difference in color is small between the background image and the captured image as the pixel of the shadow area in the area having a strong possibility of being a shadow. In the foreground image 2007, the area of the foreground object 2002 is extracted without extracting the shadow area accompanying the object 2002. However, in the foreground image 2007, the color of the object 2003 that exists on the ground surface and the color of the background image 2004 are similar, and therefore, the object 2003 is erroneously determined to be a shadow, and as a result of this, the area of the foreground object 2003 is not extracted.

In contrast to this, in the present embodiment, a foreground image 2008 is created by regarding the pixel whose difference in color between the background image and the captured image is small and whose difference in texture between the background image and the captured image is small as the pixel of the shadow area in the area having a strong possibility of being a shadow. In the foreground image 2008, the area of the object 2003 is extracted while extracting the area of the foreground object 2002 without extracting the area of the shadow that accompanies the object 2002. As described above, according to the present embodiment, it is possible to extract a foreground object not including a shadow with high accuracy irrespective of color.

Other Embodiments

The embodiments of the present invention can be a variety of embodiments, not limited to the above-described fourth and fifth embodiments. For example, in the above-described fourth and fifth embodiments, the pixel value in the RGB space of the target image and the background image is used for calculation of the degree of similarity in color, but information that is used is not limited to this. For example, it may also be possible to calculate the degree of similarity in color by using a pixel value in a different color space, such as HSV and Lab.

Further, in the above-described fourth and fifth embodiments, at the time of performing projection conversion of an image, only one plane of the ground surface is taken to be a base, but it may also be possible to use a plurality of planes parallel to the ground surface as a base. At this time, the ground surface may be included or not included in the plurality of planes to be used as a base. For example, it may also be possible to detect an area having a strong possibility of being a shadow by setting a plurality of planes by equally dividing the space between an altitude of 0 cm and an altitude of 1 cm from the ground surface and by using all converted images obtained by projection conversion with each of the set planes as a base. By doing so, the robust properties for an error in the camera parameters improve.

Further, in the above-described fourth and fifth embodiments, a common foreground area having a strong possibility of being a shadow is detected by using all the acquired foreground images at a plurality of viewpoints, but it may also be possible to detect a common foreground area by using only part of the acquired foreground images.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is possible to extract a foreground object with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
one or more memories storing instructions; and
one or more processors executing the instructions to:
acquire a target image which includes a foreground area and is based on first image capturing from a first viewpoint;
acquire a plurality of reference images including an image which is based on second image capturing from a second viewpoint being different from the first viewpoint;
convert the plurality of acquired reference images based on the first viewpoint; and
extract the foreground area included in the target image by using data relating to a difference between the target image and the plurality of converted reference images.

2. The image processing apparatus according to claim 1, wherein
projection conversion to convert the plurality of reference images into respective images corresponding to the first viewpoint with a ground surface as a base is performed.

3. The image processing apparatus according to claim 1, wherein
projection conversion to convert the plurality of reference images into respective images corresponding to a viewpoint of interest with a plurality of planes parallel to a ground surface as a base, besides the ground surface is performed.

4. The image processing apparatus according to claim 1, wherein
the one or more processors further execute the instructions to:
specify the first viewpoint;
select a reference image corresponding to a viewpoint whose distance from the specified first viewpoint is the shortest among those of viewpoints corresponding to the plurality of reference images as a base reference image from the specified first viewpoint; and
correct the selected base reference image by using the data relating to the difference, and
the foreground area included in the target image is extracted by using the corrected base reference image.

5. The image processing apparatus according to claim 4, wherein
the one or more processors further execute the instructions to correct, in a case where the data relating to the difference indicates that a degree of difference between a pixel of interest in the selected base reference image and pixels of interest in the plurality of the already converted reference images is higher than a threshold value, a value of the pixel of interest in the base reference image, and
in a case where the data relating to the difference indicates that the degree of difference between the pixel of interest in the selected base reference image and the pixels of interest in the plurality of the already converted reference images is lower than or equal to the threshold value, the value of the pixel of interest in the base reference image is not corrected.

6. The image processing apparatus according to claim 4, wherein the one or more processors further execute the instructions to:
calculate continuity indicating a degree of smoothness of a change in pixel value between pixels of interest in the converted reference image; and
detect a pixel that is a target of correction based on the data relating to the difference and the continuity.

7. The image processing apparatus according to claim 1, wherein
the one or more processors further execute the instructions to:
specify the first viewpoint; and
generate an appearance image showing an appearance from the specified first viewpoint based on the plurality of the reference images, and
correct the generated appearance image by using the data relating to the difference, and
the foreground area included in the target image is extracted by using the corrected appearance image.

8. The image processing apparatus according to claim 1, wherein
the acquired reference images are images obtained by extracting foreground areas from a plurality of captured images which are based on the second image capturing from viewpoints being different from the first viewpoint.

9. The image processing apparatus according to claim 8, wherein
the one or more processors further execute the instructions to detect a common foreground area that exists at the same position on a captured area in common in the plurality of the converted reference images as a common foreground area, and
the extracted foreground area included in the target image is extracted by modifying the reference image corresponding to the first viewpoint based on the common foreground area.

10. The image processing apparatus according to claim 9, wherein
the one or more processors further execute the instructions to creates create a flag map in which 1 is substituted for a pixel value corresponding to a pixel of the common foreground area and 0 is substituted for a pixel value corresponding to a pixel that is not a pixel of the common foreground area, and
the foreground area included in the target image is extracted by using the flag map.

11. The image processing apparatus according to claim 10, wherein
the one or more processors further execute the instructions to:
calculate a degree of similarity in color between a pixel of the target image and a pixel of a background image which does not include the foreground area, a viewpoint corresponding to the background image is substantially the same as the first viewpoint; and
determine whether the pixel of the common foreground area is a pixel of a shadow area based on the pixel value of the flag map and the degree of similarity in color, and
the foreground area included in the target image is extracted by correcting the reference image corresponding to the first viewpoint based on results of determination whether a pixel of the common foreground area is the pixel of the shadow area.

12. The image processing apparatus according to claim 11, wherein
a pixel of interest in one of the converted reference image images is determined as the pixel of the shadow area in a case where the pixel value of the flag map, which corresponds to the pixel of interest, is 1 and the target image and the background image are similar in color.

13. The image processing apparatus according to claim 11, wherein
the background image is an image generated based on a plurality of captured images corresponding to a plurality of different times captured from a viewpoint of interest along a time series, or an image is captured in a state where the foreground area does not exist.

14. The image processing apparatus according to claim 10, wherein
the one or more processors further execute the instructions to:
calculate a degree of similarity in color between a pixel of the target image and a pixel of a background image which does not include the foreground area, a viewpoint corresponding to the background image is substantially the same as the first viewpoint; and
calculate a degree of similarity in texture between the pixel of the target image and the pixel of the background image, and determines whether a pixel of the common foreground area is a pixel of a shadow area based on a pixel value of the flag map, the degree of similarity in color, and the degree of similarity in texture, and the foreground area included in the target image is extracted by correcting the reference image corresponding to the first viewpoint based on results of determination whether a pixel of the common foreground area is the pixel of the shadow area.

15. The image processing apparatus according to claim 14, wherein a pixel of interest in one of the converted reference image images is determined as the pixel of the shadow area in a case where the pixel value of the flag map, which corresponds to the pixel of interest, is 1, the target image and the background image are similar in color, and the target image and the background image are similar in texture.

16. An image processing method comprising:

acquiring a target image which includes a foreground area and is based on first image capturing from a first viewpoint;

acquiring a plurality of reference images including an image which is based on second image capturing from a second viewpoint being different from the first viewpoint;

converting a plurality of acquired reference images based on the first viewpoint; and extracting the foreground area included in the target image by using data relating to a difference between the target image and the plurality of converted reference images.

17. A non-transitory computer readable storage medium storing a program for causing a computer to perform an image processing method, the method comprising:

acquiring a target image which includes a foreground area and is based on first image capturing from a first viewpoint;

acquiring a plurality of reference images including an image which is based on second image capturing from a second viewpoint being different from the first viewpoint;

converting a plurality of acquired reference images based on the first viewpoint; and extracting the foreground area included in the target image by using data relating to a difference between the target image and the plurality of converted reference images.

* * * * *